United States Patent [19]

Matsumura

[11] Patent Number: 5,493,621
[45] Date of Patent: Feb. 20, 1996

[54] FINGERPRINT ID SYSTEM AND METHOD

[75] Inventor: Yoshihide Matsumura, Tokyo, Japan

[73] Assignee: Kabushiki Kaisya Matsumura Electronics, Tokyo, Japan

[21] Appl. No.: 228,293

[22] Filed: Apr. 15, 1994

[30] Foreign Application Priority Data

Apr. 21, 1993 [JP] Japan .................................. 5-127686

[51] Int. Cl.⁶ .................................................. G06K 9/00
[52] U.S. Cl. ........................... 382/125; 382/124; 382/127
[58] Field of Search ........................... 382/4, 5, 26, 124, 382/125, 127, 209

[56] References Cited

U.S. PATENT DOCUMENTS

| | | | |
|---|---|---|---|
| 4,310,827 | 1/1982 | Asai | 340/146.3 |
| 4,752,966 | 6/1988 | Schiller | 382/5 |
| 5,040,223 | 8/1991 | Kamiya et al. | 382/4 |
| 5,109,428 | 4/1992 | Igaki et al. | 382/5 |
| 5,351,304 | 9/1994 | Yamamoto | 382/5 |

*Primary Examiner*—Leo H. Boudreau
*Assistant Examiner*—Matthew C. Bella
*Attorney, Agent, or Firm*—Frishauf, Holtz, Goodman, Langer & Chick

[57] ABSTRACT

A fingerprint ID system, which compares input fingerprint image data with registered data, with a digital signal processor exclusive for image processing use, indpendently of a central processing unit comprises: a device for scanning the input fingerprint image data for determining the thinning thereof and for extracting minutiae therefrom; a circuit for removing a pseudo minutia from the extracted minutiae; a circuit for registering the minutiae based on positions of branch points and their positional relationships; a circuit for scoring the mismatching degree between branch points in said fingerprint image data and the registered data on the basis of the norm and for judging the examinee to be the person of said registered data when the mean mismatching degree of the branch point of the minimum mimatching degee is under a predetermined value. When the recognition rate based on minutiae of a fingerprint is low, template matching data is registered and template matching of the input fingerprint image data against the registered data takes place.

9 Claims, 22 Drawing Sheets

| P1 | P2 | P3 |
|----|----|----|
| P8 | P0 | P4 |
| P7 | P6 | P5 |

FIG. 2

| 0 | 3 | 6 | 7 | 10 | 11 | 12 | 14 | 15 | 22 |
|---|---|---|---|----|----|----|----|----|----|
| 24 | 26 | 27 | 28 | 30 | 31 | 40 | 42 | 43 | 44 |
| 46 | 47 | 48 | 56 | 58 | 59 | 60 | 62 | 63 | 96 |
| 104 | 106 | 107 | 108 | 110 | 111 | 112 | 120 | 122 | 123 |
| 124 | 126 | 127 | 129 | 130 | 131 | 134 | 135 | 138 | 139 |
| 142 | 143 | 154 | 155 | 158 | 159 | 160 | 161 | 162 | 163 |
| 166 | 167 | 168 | 169 | 172 | 173 | 176 | 177 | 178 | 179 |
| 182 | 183 | 184 | 185 | 188 | 189 | 192 | 193 | 194 | 195 |
| 198 | 199 | 202 | 203 | 206 | 207 | 218 | 219 | 222 | 223 |
| 224 | 225 | 226 | 227 | 230 | 231 | 232 | 233 | 236 | 237 |
| 240 | 241 | 242 | 243 | 246 | 247 | 248 | 249 | 242 | 253 |

FIG. 3

| | | | | | | | |
|---|---|---|---|---|---|---|---|
| INTERSECTION | 85 | 170 | | | | | |
| BRANCH POINT | 21 | 37 | 41 | 69 | 73 | 74 | 81 | 82 | 84 |
| | 146 | 148 | 164 | | | | | |
| END POINT | 1 | 2 | 4 | 8 | 16 | 32 | 64 | 128 |

CURVATURE OF CENTRAL AREA $(I,J)$: $K(I, J) = \sum_{L=1}^{8} T(L)$

| I-1,J-1 | I-1,J | I-1,J+1 |
|---|---|---|
| I ,J-1 | I ,J | I ,J+1 |
| I+1 ,J-1 | I+1, J | I+1, J |

WHERE $T(1) = |G(I-1,J-1) - G(I-1,J+1)|$ $T(2) = |G(I-1,J+1) - G(I+1,J+1)|$ $T(3) = |G(I+1,J+1) - G(I+1,J-1)|$ $T(4) = |G(I+1,J-1) - G(I-1,J-1)|$ $T(5) = |G(I-1,J) - G(I,J+1)|$ $T(6) = |G(I,J-1) - G(I+1,J)|$ $T(7) = |G(I+1,J) - G(I,J+1)|$ $T(8) = |G(I,J-1) - G(I-1,J)|$

WHERE G(I,J) IS DIRECTION OF AREA(I,J) AND T(L) IS ABSOLUTE VALUE OF DIFFERENCE IN DIRECTION $T(L) = \begin{cases} T(L) : T(L) \leq 4 \\ 8 - T(L) : T(L) > 4 \end{cases}$

FINGERPRINT ID SYSTEM AND METHOD

BACKGROUND OF THE INVENTION

The present invention relates to a fingerprint ID system and method which permits real-time comparison of fingerprint image data with previously stored image data.

Fingerprints are utilized as most reliable means to identify individuals because of two outstanding characteristics that they remain unchanged all through life and differ from individual to individual. The features that are used for fingerprint identification are a break point (or end point) of a bulge line (a convexity of a fingerprint pattern) and a point where the bulge line branches (a branch point); these features are generically called minutiae. Since the matching of a fingerprint as an image is encountered with difficulties in the file capacity and matching speed, the fingerprint identification is carried out using the positional relationship of features or minutiae that are extracted from the fingerprint image. The extraction of minutiae from the input fingerprint image begins with the correction of the original image by smoothing and emphasizing, followed by detecting the orientation of the fingerprint pattern. A binary bulge line image is formed by local two-dimensional differential filtering and threshold processing on the basis of the detected orientation. The bulge line image is subjected to thinning processing to detect the positions of minutiae and the direction of the bulge line is measured for each minutia. Furthermore, the number of intersecting bulge lines is detected as the relationship between neighboring minutiae, by which the position coordinate of each minutia, the pattern orientation and the relationship between neighboring minutiae are listed. The input fingerprint is compared with the previously registered fingerprint by checking individual minutiae of the former against those of the latter.

There has been proposed a fingerprint ID system of the type that compares in real time the input fingerprint image data with registered data to identify individuals. This fingerprint ID system uses a general-purpose microprocessor to perform pre-processing for removing noise from the input image, binary processing for converting the pixel value of image data to a binary value "1" or "0" through use of a predetermined threshold value, thinning processing for extracting a figure of the same line width from the binary image, processing for extracting minutiae and pattern matching. In other words, the microprocessor performs the whole image processing.

In the conventional fingerprint ID system, however, image processing for fingerprint identification is carried out exclusively by the general-purpose microprocessor; hence, the processing time increases in proportion to the amount of data to be processed and the complexity of processing, slowing down the system's response in the fingerprint identification.

That is, in image processing by computer software, for example, when 512- by 512-pixel image data is processed for thinning by sequentially scanning it in 3- by 3-pixel blocks, the image data is scanned 510 by 510 times. In the thinning process for extracting a figure of binary image data as a line figure of the same line width without impairing its continuity, it is necessary that: the line width be kept constant; the line be positioned at the center of the original figure; the continuity of the figure be maintained; and end points of the figure not be reduced. In addition, processing is needed to suppress the generation of whiskers in concave and convex portion of the fingerprint between bulge lines and at their intersections. Thus, an appreciably large number of processing steps are involved in the entire image processing.

The above-mentioned scanning for thinning is repeated until it converges all over the display image. Hence, the reduction of the response time of the fingerprint ID system calls for improving the thinning scheme and the hardware configuration therefor.

By mounting hardware exclusive for image processing, the response time could be shortened, but it is undesirable to incorporate such hardware in the fingerprint ID system which is a consumer product required to be low-cost and small-sized and the mounting hardware exclusive for image processing is inferior to software processing by a computer in terms of systems extensibility.

Besides, the prior art fingerprint ID system utilizes either one of minutia matching and template matching schemes. The minutia matching scheme is excellent in that it ensures stable matching even if the fingerprint to be examined becomes misaligned by rotational movement, but all fingerprints do not have clear minutiae and bulge lines may Sometimes be totally flat or unclear. In such a situation, the template matching scheme may provide a higher rate in recognition. That is, the fingerprint ID system of the type using the minutia matching scheme alone cannot always acheive a high success rate in recognition.

SUMMARY OF THE INVENTION

It is therefore an object of the present invention to provide a fingerprint ID system and method which permit high-speed matching of fingerprints while keeping a high recognition rate.

Another object of the present invention is to provide a low-cost, small-sized fingerprint ID system and a method therefor.

BRIEF DESCRIPTION OF THE DRAWINGS

FIG. 2 is a schematic diagram showing the positional relationships of respective pixels in a 3- by 3-pixel matrix;

FIG. 3 is a table adjoining point pattern index values for which the center pixel in the pixel matrix is deletable;

FIG. 5 is a table showing adjoining point pattern index values of eight adjoining cells of the pixel matrix at an intersection, a branch point and an end point of bulge lines;

FIGS. 6A to 6C schematically show patterns of the eight neighboring cells at the intersection, branch point and end point;

FIGS. 25A to 25C show diagrams explanatory of the operation of the FIG. 13 embodiment;

FIG. 27 is a table showing bulge-line direction data used to compute a curvature of a bulge line.

DESCRIPTION OF THE PREFERRED EMBODIMENTS

FIGS. 1 through 12 are diagrams explanatory of the fingerprint ID system and method according to an embodiment of the present invention, which compare fingerprint image data with registered or previously stored image data in real time.

Figure 1:
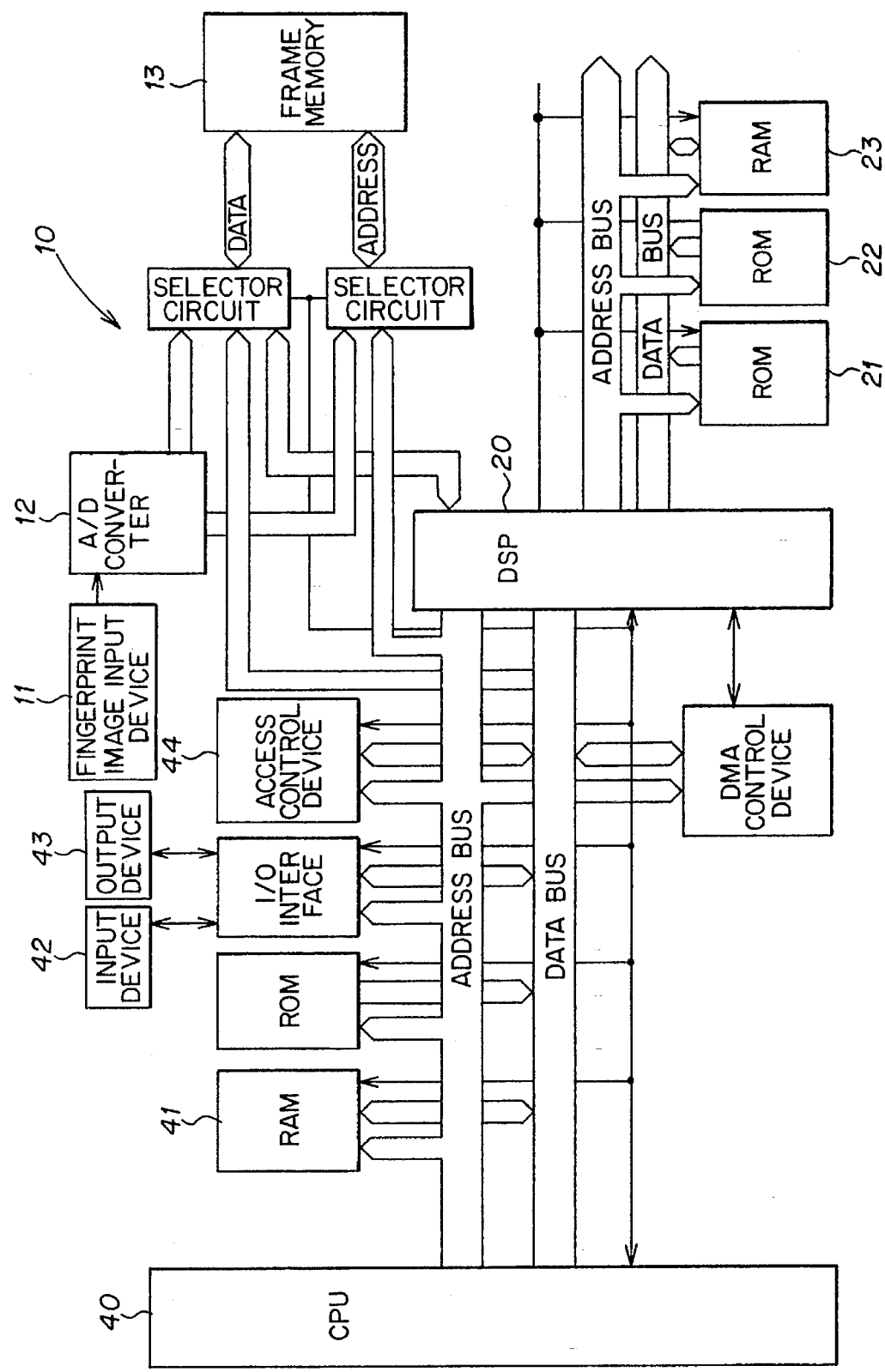
FIG. 1 is a block diagram illustrating the hardware configuration of an embodiment of the present invention.

FIG. 1 illustrates in block form the fingerprint ID system, which is indicated generally by 10. The fingerprint ID system 10 comprises a fingerprint image input device 11, an A/D converter 12, a frame memory 13 for storing image data, an image processor 20, a read-only memory 21 for storing adjoining point pattern index values which are used for scanning for thinning, a read-only memory 22 which is used for scanning for the extraction of features or minutiae, a memory 23 for storing control information of scanning for thinning, a memory 41 for storing registered data, an input device 42, an output device 43, an access control signal generator 44 and a central processing unit (CPU) 40.

The fingerprint image input device 11 is made up of a sheet of transparent glass on which to place a finger under test, a light source for illuminating a fingerprint uniformly, a lens through which reflected light passes to create an image, and a CCD area sensor. The video output signal from the CCD area sensor is sampled by the A/D converter 12, whose output digital code is transferred to and stored in the frame memory 13.

The image processor 20 is provided with a digital signal processor (DPS) which performs sum-of-product and vector calculations at high speed and which is connected via a bus to the read-only memories 21 and 22 for high-speed image processing. The read-only memory 21 has stored therein adjoining point pattern indexes for thinning table search and the read-only memory 22 adjoining point pattern indexes for feature or minutia table search.

The input device 42 is a device through which a password and a command for modifying or deleting registered data in a registering or checking process is provided. The output device 43 is one that outputs comparison results in human-readable form; this device may be a display or audio output device, or a printer. The central processing unit (hereinafter referred to as a CPU) 40 controls at least the input and output devices 42 and 43 and the access control signal generator 44 and conducts image data management and hysteresis management in the registration and comparison processes. The access control signal generator 44 includes a control signal generator which generates a control signal for opening or closing a door, for example, on the basis of fingerprint comparison results.

Next, the operation of this embodiment will be described.

Thinning Processing

A detailed description will be given first, with reference to FIGS. 2 through 4, of thinning processing which is performed by the fingerprint ID system 10 of the above-mentioned hardware structure. The thinning processing is to extract line information from a block of image data "1." In concrete terms, when the value of a pixel at a cell of interest is a "1," it is changed to a "0" depending on the pattern of adjoining pixels; the image data is repeatedly scanned and when there no longer exists in the image data such a cell whose pixel value is changed to a "0," it is determined that the thinning processing has converged and the scanning is stopped.

In the fingerprint ID system 10, eight neighboring cells, that is, eight pixels $P_i$ (where i=1 through 8) adjoining the center pixel $P_0$ in a 3- by 3-pixel matrix as shown in FIG. 2, are each assigned, as a weighting factor $W_i$, the power $2^{i-1}$ of 2 which is a value corresponding to one of bits 0 through 7 of one-byte data. The total sum, $$V_p = \sum_{i=1}^{8} X_i \times W_i,$$

of values each obtained by multiplying the pixel value $X_i$ (where i=1 through 8) of every adjoining cell $P_i$ by the weighting factor $W_i$ (where i=1 through 8) is used as an adjoining cell pattern index value for the central pixel $P_0$.

Each pixel value $X_i$ of each adjoining cell takes a binary value "0" or "1" and by the weighting factor assignment method, the adjoining cell pattern index value $V_p$ is one byte long and ranges from 0 with bits 0 through 7 being all OFF to 255 with all the bits ON.

The above-mentioned adjoining cell pattern index value is computed for every combination of the eight neighboring cells in the 3- by 3-pixel matrix for which the pixel value at the central cell is changed from "0" to "1" and the respective adjoining cell pattern index values are stored as a thinning table in the memory 21 as shown in FIG. 3.

Next, a description will be given of thinning determination processing whereby it is determined if the pixel at the center of the 3- by 3-pixel matrix, when it is a "1," can be deleted from the screen, without impairing the continuity of the display image, by changing the pixel value at the center from "1" to "0." The adjoining cell pattern index value $V_p$ of the eight adjoining cells is computed and the thinning table is searched for the same value as that $V_p$. When the same value as the index value $V_p$ is found in the thinning table, the pixel value at the center of the matrix is changed from "1" to "0" and when such a value is not found, the pixel value at the center is held unchanged.

When the same value as the adjoining cell pattern index values of the eight neighboring cells is not found in the thinning table, it is determined that the thinning of the neighboring cell concerned has converged. Where the adjoining cell pattern index is present in the table and the pixel value the central cell is changed from "1" to "0," it is determined that the thinning of the neighboring cell has not yet converged. Scanning control means, which controls the scanning of the screen on which a predetermined region of the input image data is being displayed, sequentially scans the screen while shifting the center cell of the eight neighboring cells one by one. This sequential scanning takes place until no deletable pixel point is found.

Figure 4:
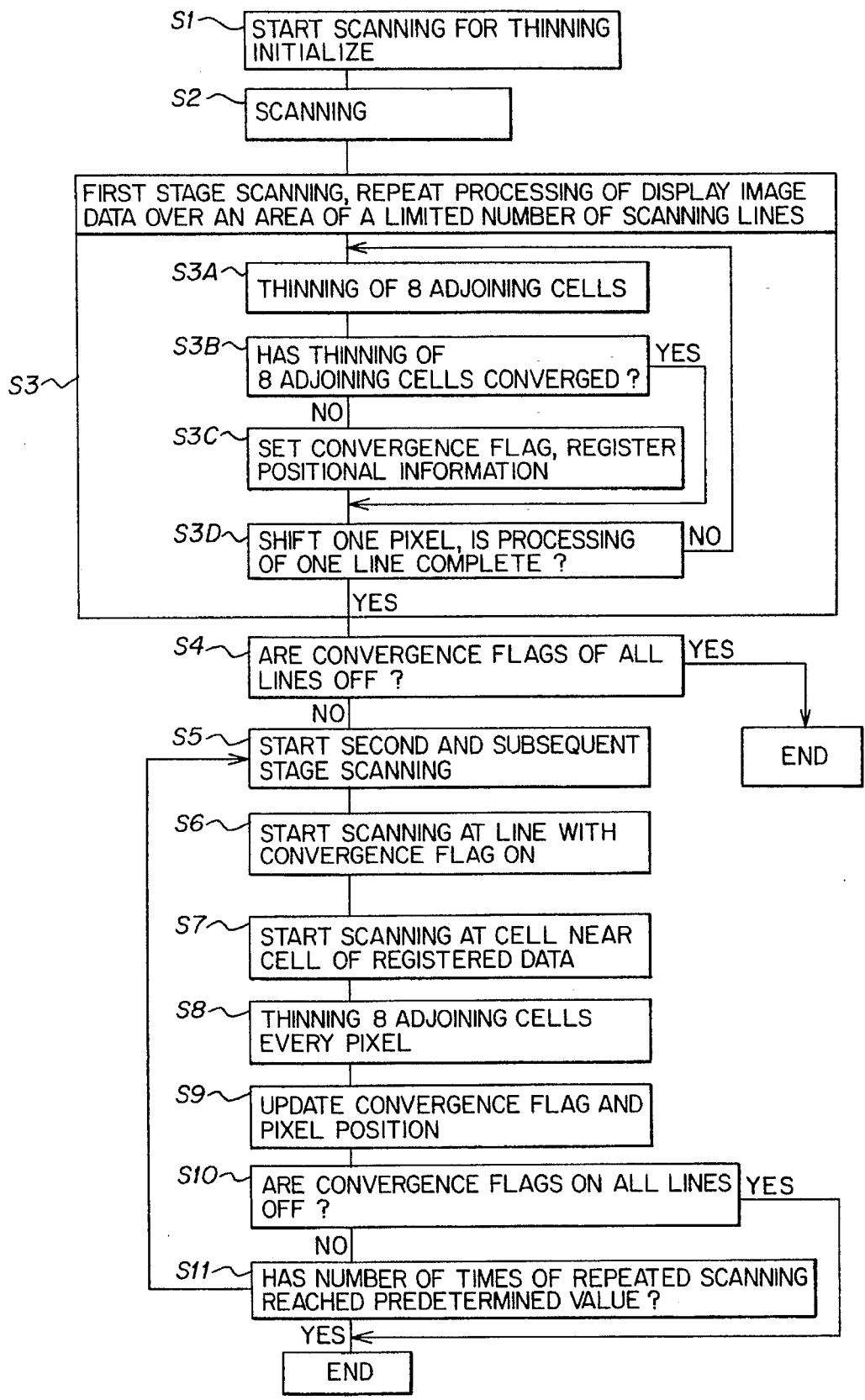
FIG. 4 is a flowchart for a thinning process.

FIG. 4 is a flowchart for the thinning process. When the scan for thinning is started in step S1, the screen scan is initialized in step S2, after which a first step of screen scanning is performed in step S3. That is, in step S3A the thinning of the eight neighboring cells is carried out and in step S3B it is determined if the thinning has converged. If the thinning has not converged, flow proceeds to step S3C wherein a thinning convergence flag is set and its positional information is registered and thence to step S3D wherein it is determined if the thinning has shifted by one pixel or has been completed for one line. When the thinning of the eight adjoining cells has converged, flow proceeds to step S3D, and if it is determined that the thinning has not completed for one line, then flow goes back to step S3A until processing of one line is complete. In step S4, it is determined if thinning convergence flags are all OFF on the line, and if so, the thinning process ends, and if even one of the flags is ON, second and subsequent steps of screen scanning are started in step S5. This is followed by step S6 wherein the scanning is started at the line where the thinning convergence flag is ON, then by step S7 wherein the scanning skips to a registered neighboring cell. Then, in step S8 the thinning process is performed for each of the eight adjoining cells, after which the thinning convergence flags and their pixel positions are updated in step S9. Next, it is determined in step S10 if the thinning convergence flags on the lines of the screen are all OFF, and if even one of the flags is ON, flow proceeds to step S11 wherein it is determined if the number of repititions of the scanning is greater than a predetermined value; if so or when the thinning convergence flags are all OFF in step S10, flow comes to an end, and if not, flow returns to step S5, repeating the above-described processing.

As described above, according to the fingerprint ID system 10, in at least the first screen scanning after resetting thinning scan control information, the screen is scanned line by line from the top left-hand corner to the bottom right-hand corner thereof while shifting the center cell of the cell matrix for each pixel. Scan control information for thinning is computed for each line in this screen scanning and prestored in a memory. This control information is composed of: a thinning convergence flag that is set when the line contains an adjoining cell for which the thinning does not converge; the positional information of that adjoining cell in the line; and the number of continuous pixel points for which the thinning does not converge.

When the scanning of the image data is complete, if the thinning convergence flags of the scanned lines are all OFF, it is determined that the thinning process of the screen has converged; then, the scanning is stopped. When at least one thinning convergence flag is ON on the scanned lines, the image data is scanned again. In this instance, the above-said scan control information stored during the previous scanning is used to start the scanning on the line where the thinning convergence flag is ON and at the first one of the pixel points for which the thinning has not converged. On each line the display data is scanned for each pixel of every 3- by 3-pixel matrix and it is determined if the pixel point is deletable, updating the scan control information for each line. When the thinning of all adjoining cells on the scanned line has converged, the convergence flag of the line is reset. When there exists in the line a sequence of contiguous pixel points for which the thinning has not converged, the scanning skips them on that line. The scanning of the screen for thinning is repeated until the convergence flags of all lines go OFF, or by a predetermined number of times.

Extraction of Minutia

Figures 6A, 6B, 6C:
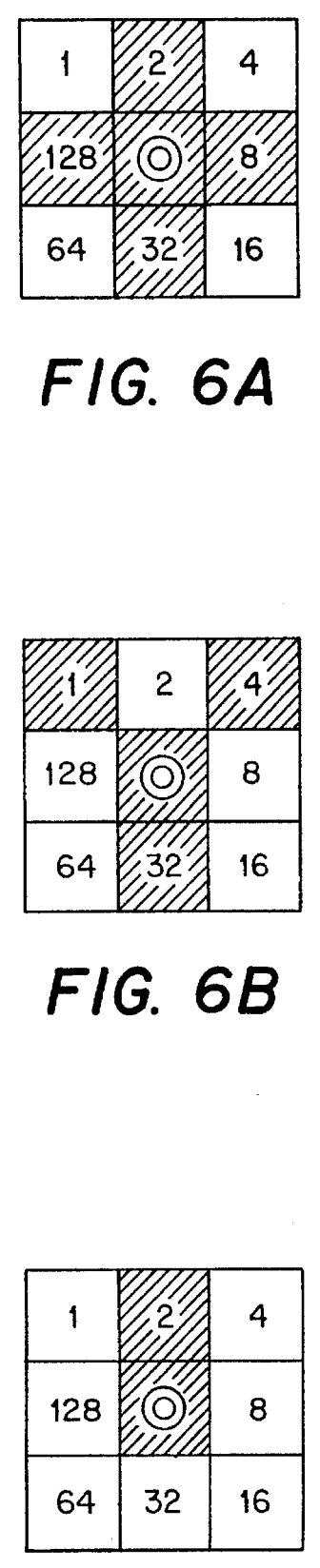

Next, a description will be given, with reference to FIGS. 5 through 7, of minutia extraction processing in the fingerprint ID system 10. Adjoining cell pattern indexes of the eight neighboring cells, which represent intersections, branch points and end points, are prestored in a look-up table. The adjoining cell pattern indexes are computed in units of eight adjoining cells over a predetermined area of the image data processed for thinning, and the look-up table is searched for each of the adjoining cell pattern indexes. When it is found in the table, its coordinates are stored in a memory as a candidate for each of the intersection, branch point and end point. For instance, the adjoining cell pattern index is determined to represent the intersection in the case where the center pixel value surrounded by the eight adjoining cells is a "1" and the adjoining cell pattern index value is 170 or 85.

When a pair of minutiae of the same kind are close to each other, it is determined that they are pseudo minutiae by noise, and they are deleted from the memory and then true minutiae are extracted. The directions of the respective minutiae of the same kind are determined and, in this case, if their directions are the same and the distance between them is smaller than a predetermined value, then they are determined to be pseudo minutiae.

Figure 7A:
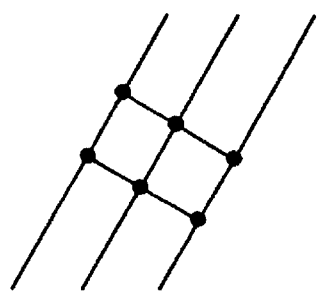
FIGS. 7A to 7C schematically show examples of pseudo minutiae.
Figure 7B:
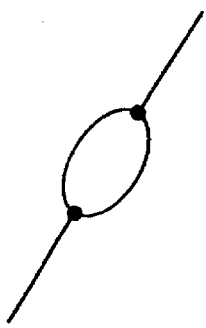
Figure 7C:
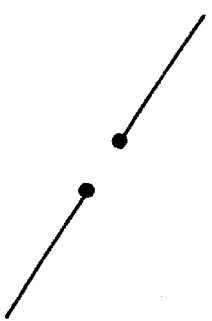

FIG. 7A shows pseudo intersections when the distance between them is short; this is deleted as a bridge from the candidate for the intersection minutia. FIG. 7B shows a pseudo branch point caused by perspiration, for instance; the branch point pair is removed from the candidate for the branch point minutia. FIG. 7C shows a pair of end points very close to each other; this is regarded as a breakpoint in a line caused by noise and is removed from the candidate for the end point minutia.

Registration of Minutiae

Figure 8:
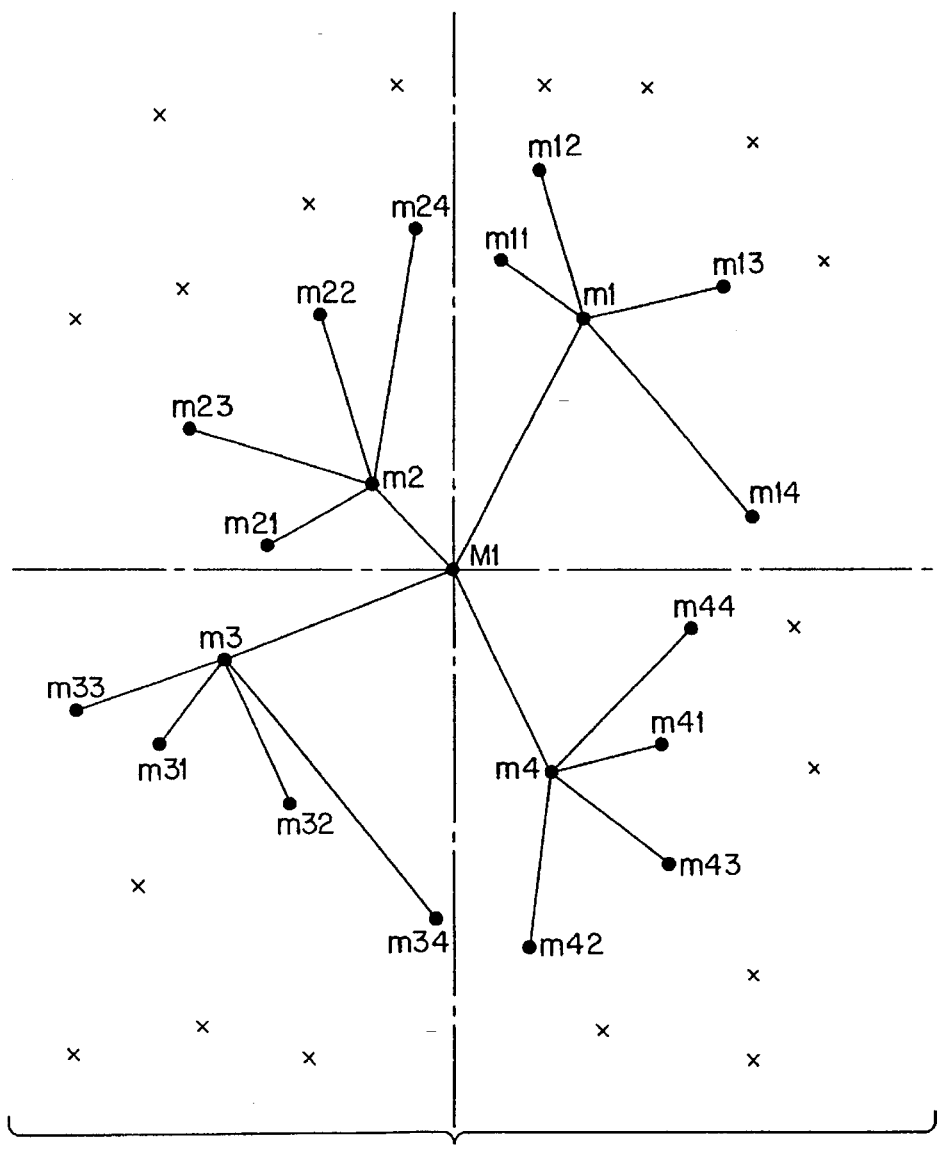
FIG. 8 is a diagram which schematically shows, by way of example, relationships of a master branch point, sub-branch points and sub-sub-branch points.
Figure 9:
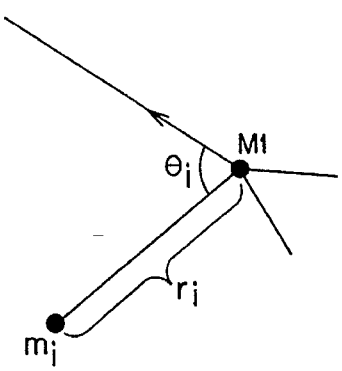
FIG. 9 is a schematic diagram showing the polar coordinate system of the master branch point in FIG. 8.

Turning mow to FIG. 8, according to the fingerprint ID system 10, a branch point closest to the center point in the scanned region of the image data is chosen as a master branch point M1. Then, a branch point nearest the master branch point in each of first through fourth quadrants with the master branch point at the origin of XY coordinates is selected as a sub-branch point $m_i$ (where i=1 through 4). Next, four branch points are selected as sub-sub-branch points $m_{ij}$ (where i, j=1 through 4) in an increasing order of distance to the sub-branch point in each quadrant. In this way, a total of 21 branch points are selected as shown in FIG. 8.

Minutia registration data is composed of: the total number of branch points; their positional addresses; relational data which represents the positional relationship between the master branch point M1 and the sub-branch point $m_i$ in terms of polar coordinates; and relational data which represents the positional relationship between the sub-branch point $m_i$ and the sub-sub-branch point $m_{ij}$. The relational data for the master branch point M1 and the sub-branch point $m_i$ is polar coordinate data which is composed of the distance $r_i$ between the master branch point M1 and the sub-branch point $m_i$ and the angle $\theta_i$ of the sub-branch point $m_i$ counterclockwise to the bulge-line direction of the master branch point M1 indicated by the arrow in FIG. 9. Incidentally, the bulge-line direction of the master branch point M1 is determined by obtaining binary image data for each processed region with use of an eight-directional filter as is well-known in the art. The positional relationship between the sub-branch point and the sub-sub-branch point is represented by polar coordinate data composed of the distance between them and the angle $\theta$ of the direction of the sub-sub-branch point with respect to the bulge-line direction of the master branch point.

Comparison Processing

Figure 10:
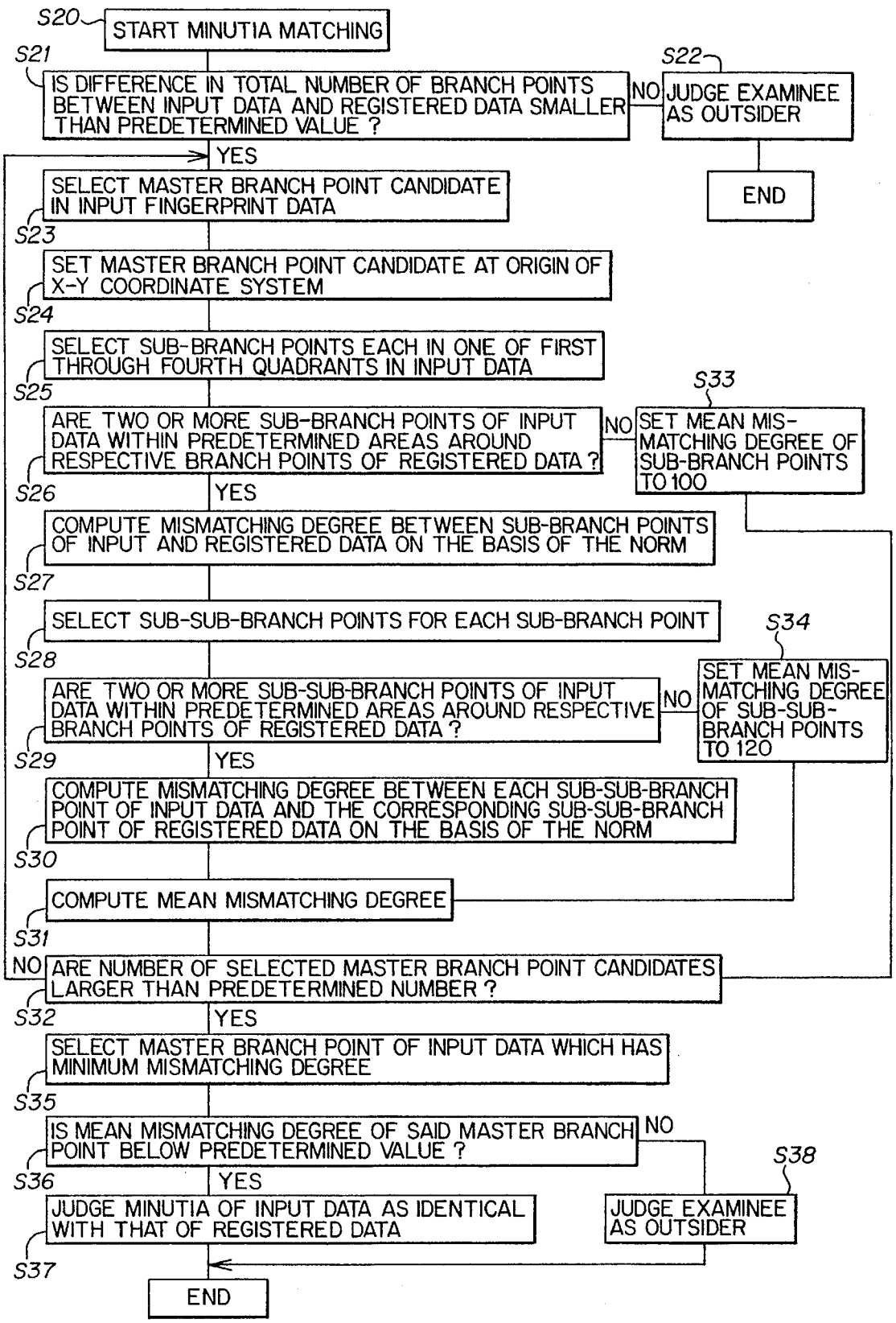
FIG. 10 is a flowchart for minutia matching.

Next, a detailed description will be given of the process for comparing features or minutiae of fingerprint image data with registered or previously stored image data. FIG. 10 is a flowchart for the minutiae comparison processing.

When the comparison is started in step S20, it is determined in step S21 whether the difference in the total number of branch points between the data to be checked and the registered data is smaller than a predetermined number. If not, it is determined in step S22 that the examinee is an outsider, and the process of this flow ends. When the above-mentioned difference in the total number of branch points is smaller than the predetermined value, it is determined that the examinee is not an outsider, after which a master branch point candidate of the data to be checked is selected in step S23 and the candidate is set as the origin of an XY coordinate system in step S24. Then, four sub-branch points are selected in the first through fourth quadrants in step S25 and, in step S26, it is determined if three or more sub-branch points are in a predetermined area around the registered branch point. If three or more sub-branch points are in the predetermined area around the registered branch point, the degree of mismatch between them is computed on the basis of the norm in step S27, then in step S28 sub-sub-branch points are chosen for each sub-branch point, and it is determined in step S29 if three or more sub-sub-branch points are present in a predetermined area around each registered branch point. When three or more sub-sub-branch points are found within the predetermined area, flow proceeds to step S30 wherein the degree of mismatch between the sub-sub-branch point and the registered sub-sub-branch point is computed, after which an average mismatching degree is computed in step S31. Then, flow proceeds to step S32.

On the other hand, in the event that three or more sub-branch points are not found within the predetermined area around each registered branch point in step S26, flow proceeds to step S33 wherein the average mismatching degree of the sub-sub-branch points is set to 100, followed by step S32. When three or more of the sub-sub-branch points are not found within the predetermined area around each registered branch point in step S29, the average mismatching degree of the sub-sub-branch points is set to 120 in step S34, then flow proceeds to step S31.

In step S32 it is determined if the number of master branch point candidates selected is larger than a predetermined value; if so, flow proceeds to step S35, and if not, flow returns to step S23, repeating the above-described processing. In step S35 the master branch point to be checked is selected which provides the minimum average mismatching degree, then in step S36 it is determined if the average mismatching degree of the master branch point is smaller than a predetermined value; if so, it is determined in step S37 that the examinee is not an outsider, and if not, it is determined in step S38 that the examinee is an outsider, and the process of this flow comes to an end.

By the above flow, the total number of branch points, their positional addresses and relational data are extracted for the data to be checked, as is the case with the registered data. It is made sure that the absolute value of the difference between %he total number of extracted branch points and the total number of branch points in the previously registered data selected for comparison is smaller than a predetermined value TH1. When the absolute value is greater than the value TH1, it is judged that there is no identity between the data to be checked and the registered data, i.e. that the examinee is an outsider.

When the above-noted absolute value is smaller than the value TH1, the branch point closest to the center of the data to be checked is selected as a master branch point candidate M'1 and it is determined if sub-branch points $m_1, m_2, m_3$ and $m_4$ are present in the branch points to be checked, on the assumption that the master branch point candidate M'1 is the master branch point M1 of the registered data. This is carried out in such a manner as described below.

The bulge-line direction of the master branch point candidate M'1 is obtained and it is determined if any branch points exist in a predetermined area around the registered sub-branch point $m_i$ (where i=1 through 4) of the polar coordinate representation $(r_i, \theta_i)$.

More specifically, a check is made to see if the sub-branch point $m_i$ of the branch point to be checked is present in a permissible area $(r_i \pm C_{ri}, \theta_i \pm C\theta_i)$ around the sub-branch point $m_i$ of the registered data. $C_{ri}$ is a given limit of the afore-mentioned distance $r_i$ and $C\theta_i$ a given limit of the afore-mentioned angle $\theta_i$.

Where two or more of the four sub-branch points $m'_i$ fall outside of the above-said area, the master branch point candidate M'1 is judged as inappropriate, after which the mean value of the mismatching degree of the sub-branch points is set to 100 and processing is performed for the next master branch point candidate as described below. When three or more sub-branch points are found in the respective permissible areas, the mismatching degree is counted as the degree of mismatching.

According to the fingerprint ID system 10, the mismatching degree $S_{pi}$ of the sub-branch point $m_i$ (where i=1 through 4) is expressed by the following equation using the norms concerning the distance r and the angle $\theta$ represented by the polar coordinates. Incidentally, $(r_x, \theta_x)$ is a polar coordinate representation of the sub-branch point $m'_i$ for the master branch point candidate of the image data to be checked.

$$S_{pi} = \|r_x - r_i\| \times 40/C_{ri} + \|\theta_x - \theta_i\| \times 40/C\theta_i$$

Also for the sub-sub-branch point $m'_{ij}$ (where i, j=1 through 4) relative to the sub-branch point $m'_i$ of the image data to be checked, the mismatching degree $S_{pi}$ is similarly expressed by the following equation using the norms concerning the distance r and the angle θ represented by the polar coordinates. Incidentally, ($r_{xx}$, $θ_{xx}$) is the polar coordinates of the sub-sub-branch point m'$_{ij}$ relative to the sub-branch point m'$_i$. ($r_{ij}$, $θ_{ij}$) is the polar coorinate representation of the position of the sub-sub-branch point $m_{ij}$ of the registered data relative to the sub-branch point $m_i$.

$$S_{pij} = \|r_{xx} - r_{ij}\| \times 50/C_{rij} + \|θ_{xx} - θ_{ij}\| \times 50/Cθ_{ij}$$

The reason for which the weight of the mismatching degree $S_{pij}$ of the sub-sub-branch point m'$_{ij}$ (where i, j=1 through 4) is made 20% larger than the mismatching degree $S_{pi}$ of the sub-branch point m'$_i$ (where i=1 through 4) is that importance is attached to the relationship that the sub-sub-branch point m'$_{1j}$ matches the registered sub-sub-branch point when the sub-branch point m'$_1$ of the data to be checked matches the registered sub-branch point $m_1$.

In the matching of the branch points of the image data to be checked with those of the registered data, if the branch points of the data to be checked are not found in the respective permissible areas, then the mismatching degree of the sub-branch points to be checked is set to 100 and the mismatching degree of the sub-sub-branch points to be checked is set to 120. In this instance, however, if the sub-branch point m'$_i$ (where i=1 through 4) does not satisfy the condition that it is present in the first through fourth quadrants with respect to the master branch point M'1 of the data to be checked, the sub-branch point will be ignored in the calculation of the mean mismatching degree. Similarly, the sub-sub-branch point m'$_{ij}$ is also ignored in the computation of the mean mismatching degree unless it is present in the quadrant where the sub-branch point m'$_i$ exists.

When two or more sub-sub-branch points m'$_{ij}$ (where i, j=1 through 4) do not fall inside of the respective permissible areas of the sub-branch points m'$_i$ (where i=1 through 4), the mean mismatching degree is set to 120.

A value obtained by dividing the sum total of the mismatching degree of the sub-branch points m'$_i$ (where i=1 through 4) and the mismatching degree of the sub-sub-branch points m'$_{ij}$ (where i, j=1 through 4) by the number of branch points involved is used as the mean mismatching degree of the master branch point candidate M'1 of the date to be checked.

A predetermined number of master branch point candidates M'1 are selected in the increasing order of the distance to the center of the display data, then the mean mismatching degree of each master branch point candidate M'1is computed, and then the candidate M'1 which provides the lowest mean mismatching degree is used as the master branch point M'1 of the data to be checked. In this instance, however, only when the mean mismatching degree of the master branch point candidates M'1 is revised downward, the mean mismatching degree of the sub-sub-branch points m'$_{ij}$ (where i, j=1 through 4) with respect to the sub-branch points m'$_i$ (where i=1 through 4) is computed. This method is used to shorten the processing time. When a value obtained by dividing the sum total of the mismatching degrees of the sub-branch points m'$_i$ (where i=1 through 4) by the number of sub-branch points is smaller than a predetermined threshold value, it is judged that the features or minutiae of the data to be checked are identical with those of the registered data, that is, the examinee is identified as the person of the registered data.

Figure 11:
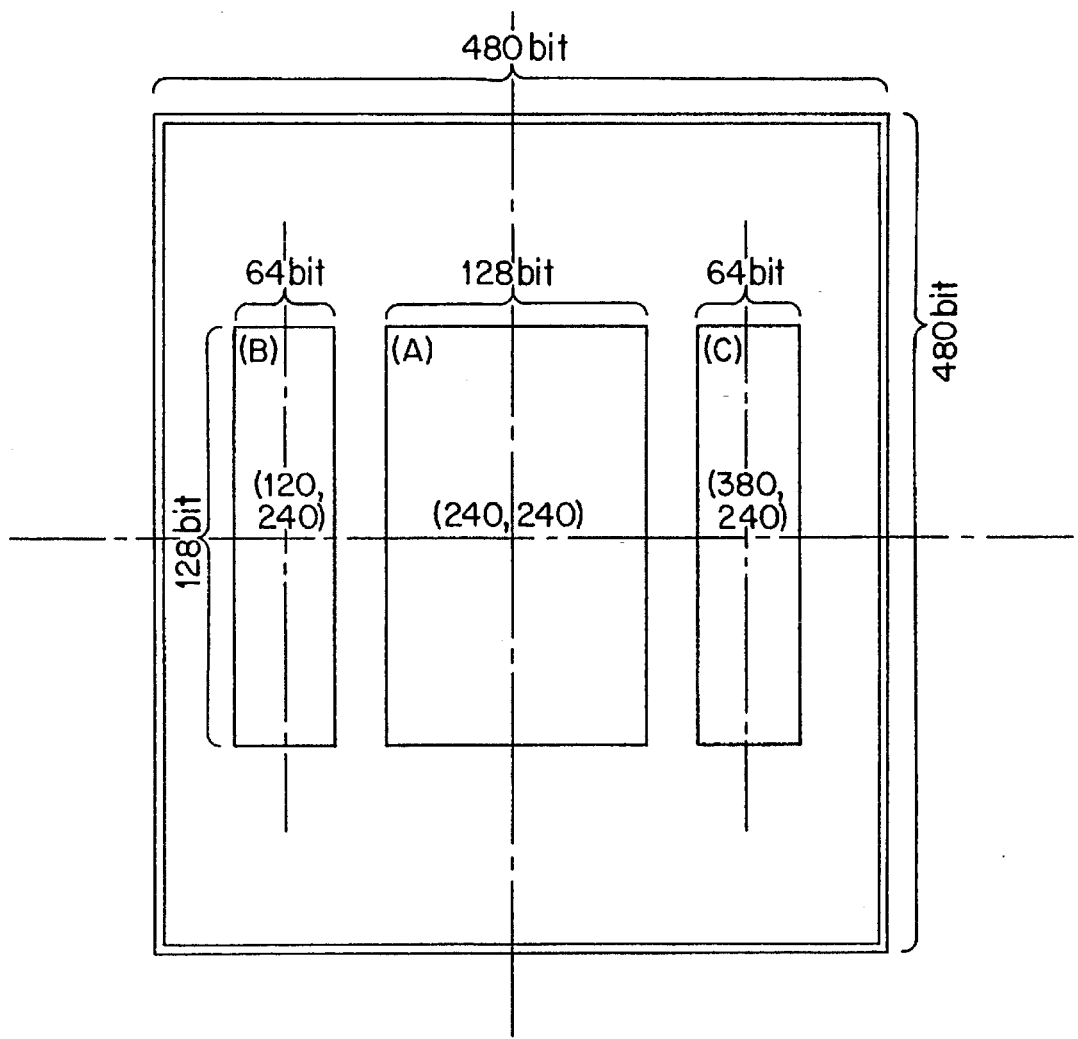
FIG. 11 is a schematic diagram showing reference areas for template matching.

In the registration of data for template matching, as shown in FIG. 11, a 128- by 128-pixel reference area A is provided around the center of binary image data and 64- by 128-pixel reference areas B and C are provided at right- and left-hand sides of the reference area A; image data with these reference areas compressed to ¼ is used as registered data. By the compression of the reference areas to ¼, the image data is broken up into cells each consisting of four pixels. These cells are each represented by a "1" or "0" depending on whether two or more pixel values are "1" or "0." Then, the numbers of pixel values "1" in respective 8×8=64 sections, each consisting of 48×48 pixels, are counted and these numbers are registered as gradation or gray scale distribution data.

The template matching of binary data begins with the alignment of the X- and Y-axes of the display image to be matched and the registered one. For this alignment, the above-mentioned gradation or gray scale distribution data is used to detect an error Or displacement (K, L), which is obtained by counting the number of pixel values "1" in the 64 sections of each data, the number thus obtained for the data to be matched with the registered data being identified by A(i, j) and the number for the registered data by B(i, j) (where i, j=1 through 8). A deviation S(K, L) is obtained by the following equation, for example, and 255 deviations are calculated.

$$S(-7, 0) = \frac{\sum_{j=1}^{8} A(8, j) - B(1, j)}{48 \times 8}$$

$$S(-6, 0) = \frac{\sum_{p=1}^{2} \sum_{i=1}^{8} \sum_{j=1}^{8} A(1, j) - B(p, j)}{48 \times 8 \times 2}$$

The displacement (K, L) which provides the minimum deviation is obtained. At first, the display image A' to be examined is matched against the registered display image A every five pixels about the above-noted displacement (K, L) and the position coordinate is obtained which provides the minimum difference between both display images A' and A which is expressed by the number of exclusive ORs "1." Next, the difference between both display images A' and A is computed every pixel around the above-noted position coordinate and the difference thus obtained is used as a displacement to obtain the position of the minimum difference.

The display image to be examined is shifted in parallel by the amount of the above-mentioned displacement and the reference area A' is matched against the counterpart A. When the difference between them is smaller than a predetermined value TH1, the examinee is identified as the person of the registered data, and when the difference is greater than a predetermined value TH2, the examinee is judged as an outsider. When the difference is intermediate between the predetermined values TH1 and TH2, the reference areas B and C shown in FIG. 11 are matched with those of the registered data; if the differences in the reference areas are smaller than predetermined values TH3 and TH4, respectively, the examinee is judged as the person of the registered data, and if not, he is judged as an outsider.

Figure 12:
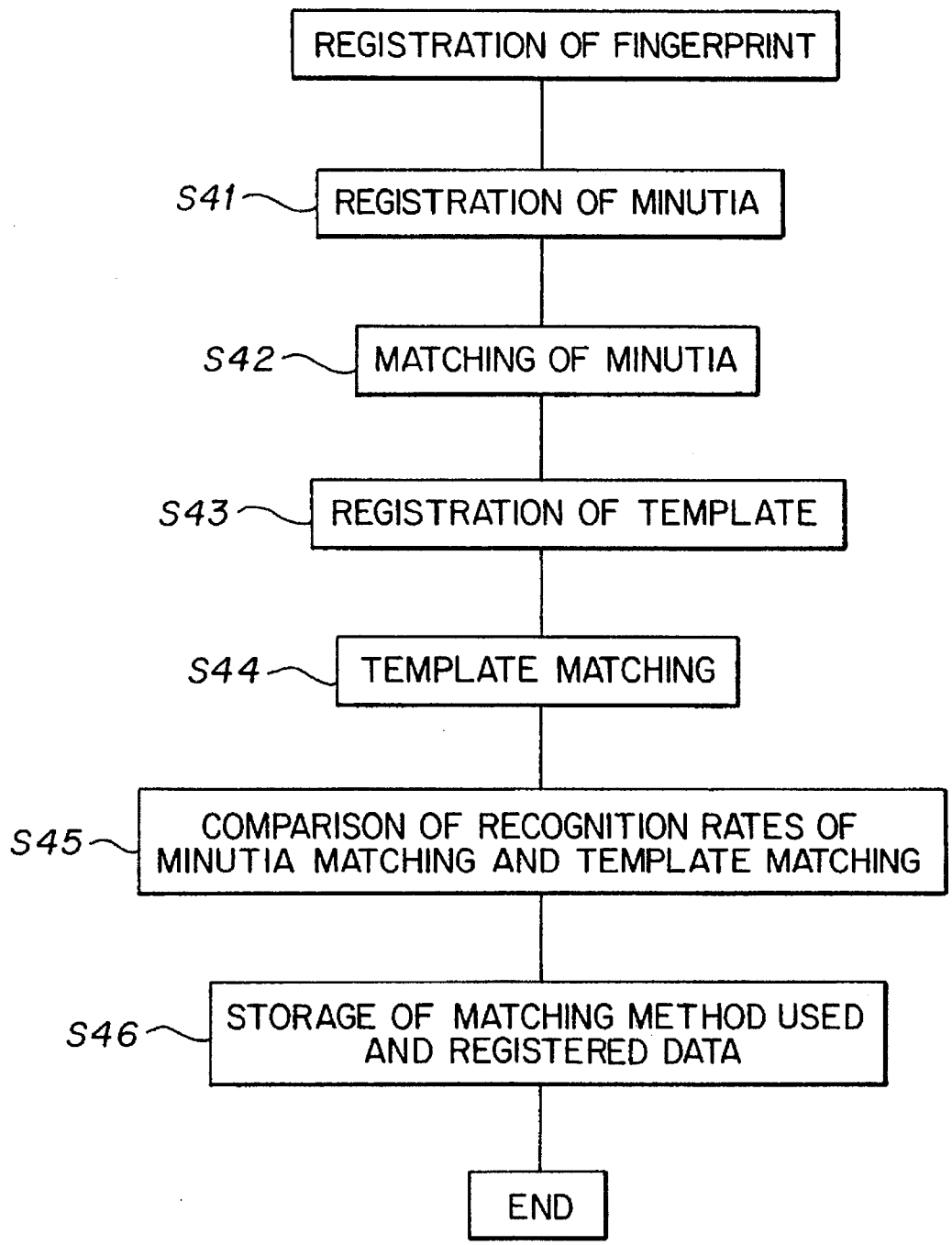
FIG. 12 is a flowchart for the registration of a fingerprint according to the present invention.

Referring to FIG. 12, the above will be described more specifically. FIG. 12 is a flowchart for the registration of a fingerprint.

A description will be given of the registration of a fingerprint. Fingerprint image data of a 2- by 2-cm area of the finger placed on an image processor is subjected to photoelectric conversion by a CCD area sensor (not shown) of the image input device 11 in FIG. 1 and stored in the frame memory 13 via the A/D converter 12.

The fingerprint image data thus stored in the frame memory is subjected to pre-processing such as smoothing.

The smoothing of the image data is carried out by removing noise through use of a filter as is well-known in the art. Then, the image data is converted into binary form. The interpolation of a threshold value, which depends on the area of the binary display image, also utilizes a well-known method.

The binary image is subjected to thinning processing, then features or minutiae of the image data are extracted, and the afore-mentioned data on branch points is registered as minutiae registered data in step S41. Next, the image data is matched against the data to be checked, by a minutiae matching method in step S42 and, for the binary image data, template matching data is registered in a memory in step S43. The determination of the bulge-line direction of the fingerprint for template matching use utilizes an eight-directional filter as is well-known in the art. The image data stored in the frame memory is template-matched as data to be matched in step S44.

In step S45 the minutiae matching method and the template matching method are compared in terms of the recognition rate. When the template matching method has a higher rate in recognition, it is adopted as the matching method of the finger being examined. When the minutiae matching method is higher in the recognition rate, it is adopted. Then, the registered image data and the matching method therefor are stored in a memory in association with each other in step S46. More specifically, when the fingerprint matching the registered one cannot be identified as being identical by the minutiae matching method, the template matching method is used. With the minutiae matching method, the recognition rate can be quantified through utilization of the ratio between the mean mistching degree and a predetermined value for authenticating the examinee's identity; in the case of the template matching method, the recognition rate can be quantified using the ratio between the afore-mentioned difference and the above-note predetermined value for authenticating the examinee's identity.

Incidentally, the template matching method or minutiae matching method is selected in the fingerprint registration on the basis of data of one screen scanning, but for the purpose of testing the recognition rate, image data of one frame may be stored in the frame memory. The screen scanning time is about 50 ms; the examinee's finger need not be placed on the image processor again and again and the data for matching can be scanned and stored during one fingerprinting.

In the course of registration, an ID number or password is input as an index of the registerd fingerprint data. In the matching process, the ID number of password is input and then the finger to be examined is placed on the image input device. The ID number serves as an index key to access the registered fingerprint data, speeding up the search for registered data. The ID number that is used in the registration step may be common to a plurality of persons forming the same group; in such a case, the data to be examined is matched with a plurality of pieces of registered fingerprint data one after another.

The image processing described above, that is, pre-processing, processing for conversion into binary form, thinning processing, minutiae extration and matching are all performed by a digital signal processor. The adjoining cell pattern index values for eight adjoining cells are computed at high speed by a digital signal processor designed to be suitable for the sum-of-product computation. Alternatively, the adjoining cell pattern index values could be obtained at high speed by a method in which a register of a one-byte bit width is initially cleared, the eight adjoining cells are squentially scanned when the respective adjoining pixel values are "1," and the bits in the byte corresponding to the respective adjoining cells are turned ON.

While the table search for the thinning determination and for the minutiae extaction is performed by linearly searching memories by the digital signal processor, it may be a binary search; alternatively, it is possible to use a device which is provided with means for accessing the read-only memory by using the adjoining cell pattern index value as a one-byte read address, and in this instance, it is determined if the thinning process is to be performed, according to the read-out contents of the read-only memory. With the look-up table operating method according to the present invention, the machine time for the convergence of the thinning process of a screen composed of about 500 by 500 pixels can be made as short as 30 to 50 ms. The matching response time is as short as around 1 sec.

As will be appreciated from the above, the fingerprint ID system of the present invention permits high-speed processing for thinning the image data and extraction of minutiae in units of eight adjoining cells by the digital signal processor provided independently of the central processing unit; furthermore, the invention achieves a high recognition rate unobtainable with the minutiae extraction method alone and as short a matching response time as one second or so, by the means for matching a fingerprint with no remarkable minutiae through the template matching method. Besides, the combined use of the digital signal processor and the microprocessor offers an economical fingerprint ID system higher in cost performance than a system using a single high-performance microprocessor.

Next, a description will be given of another embodiment of the present invention, which is intended for reduction of the cost of hardware by increasing the amount of data to be processed in the form of software while maintaining the performace of the system at a high level. In order that dry, wet and nonlinear fingerprints may be captured as constant and stable data, automatic contrast control is effected at the time of data input to thereby shorten the processing time and enhance the recognition rate. This embodiment employs a two-stage comparison scheme including a curvature pattern comparison and an extracted minutiae comparison and adopts a high-precision thinning process for the extraction of minutiae and, by a unique high-speed algorithm, solves the "long processing time" problem of the thinning scheme so as to reduce the overall processing time and enhance the system performance.

Figure 13:
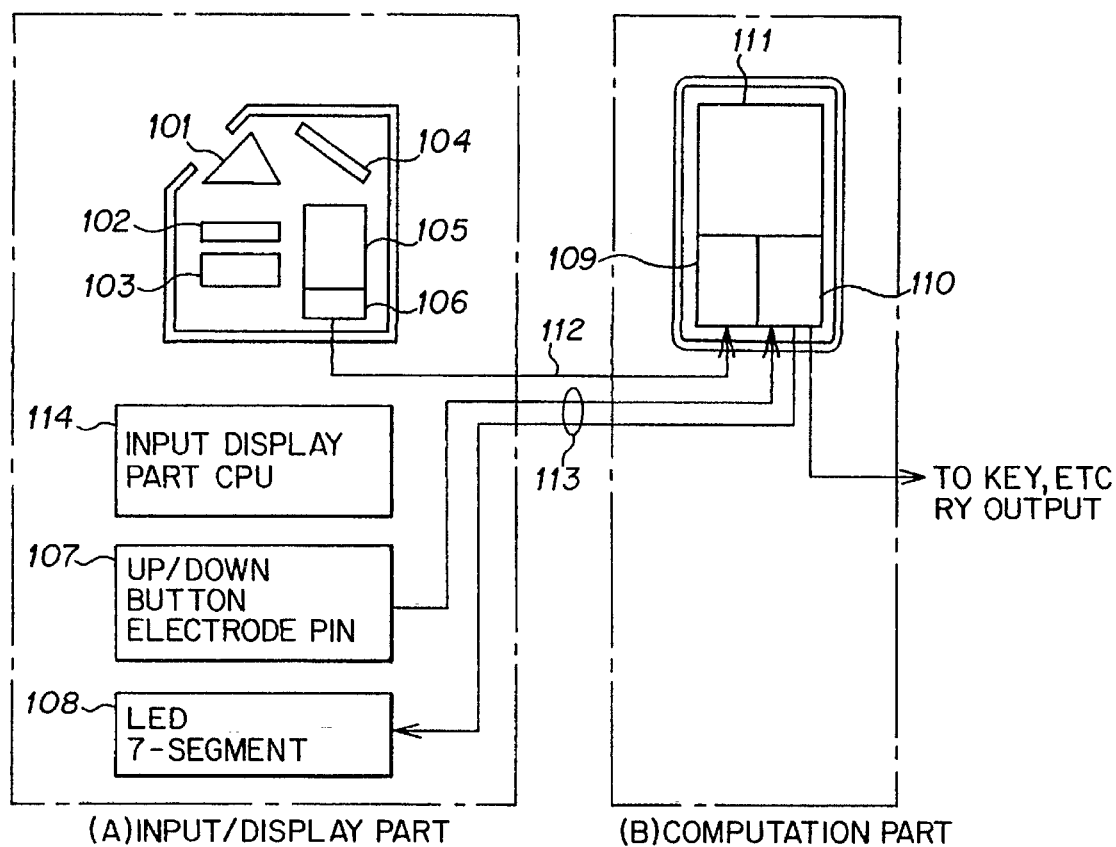
FIG. 13 is a block diagram illustrating the principal part of another embodiment of the present invention.
Figure 14:
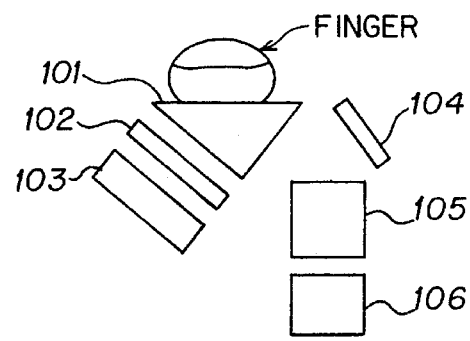
FIG. 14 is a schematic diagram explanatory of the operation of the FIG. 13 embodiment.

FIG. 13 illustrates in block form the system configuration of this embodiment, which comprises an input/display part (A) and a computation part (B). Light emitted from a light source 103 is diffused by a diffuser 102 and is totally reflected by a prism 101; the fingerprint image therefrom is reflected by a mirror 104 and passes through a lens 105, creating an image on a CCD 106 for conversion into an analog signal. The analog signal is provided via a cable 112 to an A/D converter 109 for conversion into a digital signal, which is subjected to software processing in a computing part 111 for matching with previously obtained data. When the examinee is identified as the person of the registered data, it is indicated to an interface 110 with the outside.

The light source 103 is selected in accordance with the sensitivity characteristic of the CCD 106 and the diffuser 102 is provided so that no variation is caused in the surface of the prism 101. To make the input part compact, the optical axis is bent by the mirror 104 to provide for increased optical path. The lens 105 is adjusted so that the fingerprint of the ball of a finger pressed against the surface of the prism 101 over an area measuring 16 by 16 mm is formed into an image of the real size uniformly all over the surface of the CCD 106. The COD 106 obtains data of 256 by 256 pixels from the image and the data is converted by the A/D converter 109, thereafter being captured into the computation part 111 and fed into a CPU 111-a in FIG. 16.

Figure 15:
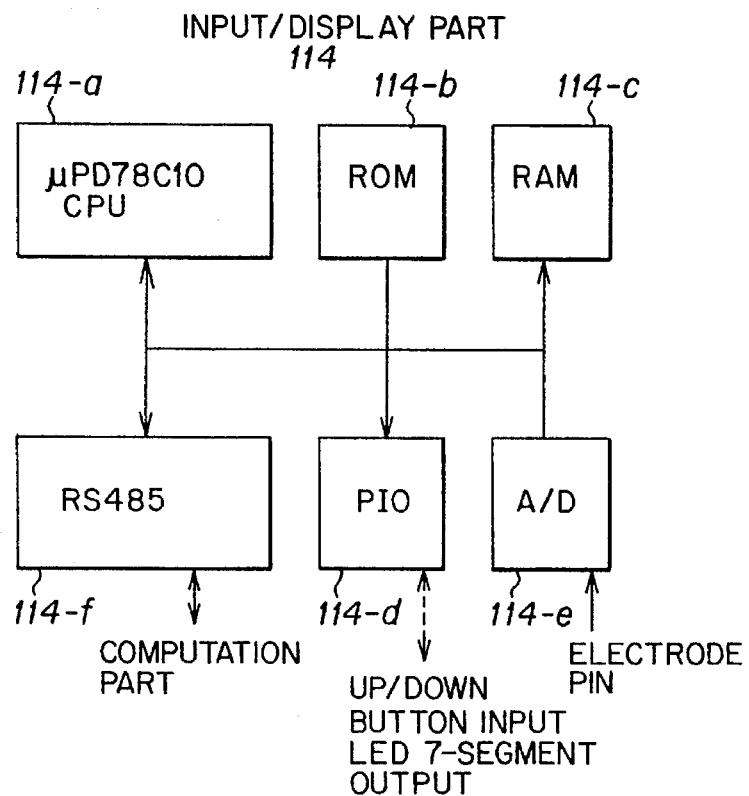
FIG. 15 is a block diagram showing an input display part in the FIG. 13 embodiment.
Figure 16:
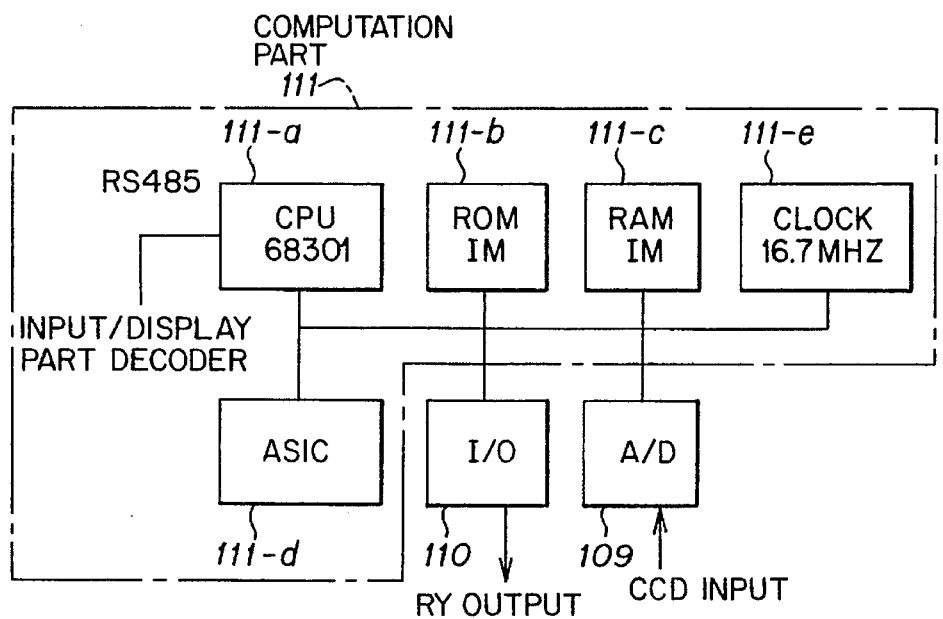
FIG. 16 is a block diagram showing a computation part in the FIG. 13 embodiment.

FIG. 16 illustrates in block form the computation part 111, which is made up of a 16-bit CPU 111-a, a ROM 111-b, a RAM 111-c, an ASIC very large Scale integrated logical circuit 111-d and an oscillator 111-e. The computation part 111 performs high-speed data processing. An input display part 114 shown in FIG. 15 functions as an interface with a user and provides required displays in the cases of inputting, matching and registering data, for instance.

FIG. 15 shows the input display part 114, which is comprised of a CPU 114-a, a ROM 114-b, a RAM 114-c, a parallel interface 114-d, an A/D converter 114-e and an interface 114-f to the computation part 111.

Figure 17A:
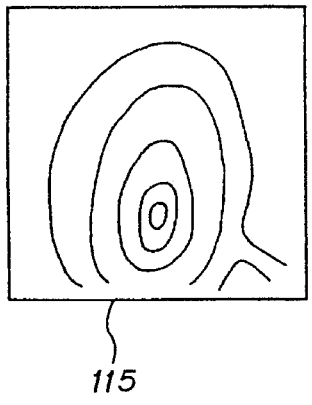
FIGS. 17A to 17C schematically show fingerprint data captured in the computation part.
Figure 17B:
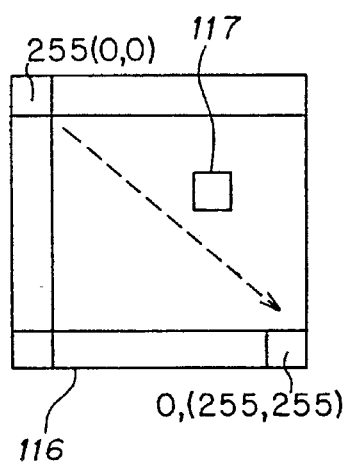
Figure 17C:
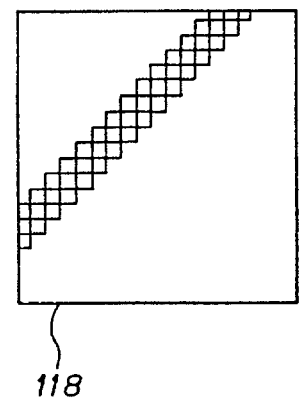

FIG. 17A to 17C show an example of fingerprint data captured into the computation part 111. The fingerprint data is composed of 256×256 pieces of data, each of which forms 8-bit data and takes values from 0 to 255, 0 representing the darkest part of the fingerprint and 255 the lightest part. In other words, the dark-and-light pattern of the fingerprint image 115 (FIG. 17A) of a 16- by 16-mm size on the prism 101 is represented by a data image 116 (FIG. 17B) and by numerical values from 0 to 255 of the 256×256 pieces of data. FIGS. 17C shows an area of data 118. Since the number of bulge lines of a man's fingerprint ranges from 2 to 7 per millimeter, one bulge line has an 8 to 3 cell data width.

Figure 18A:
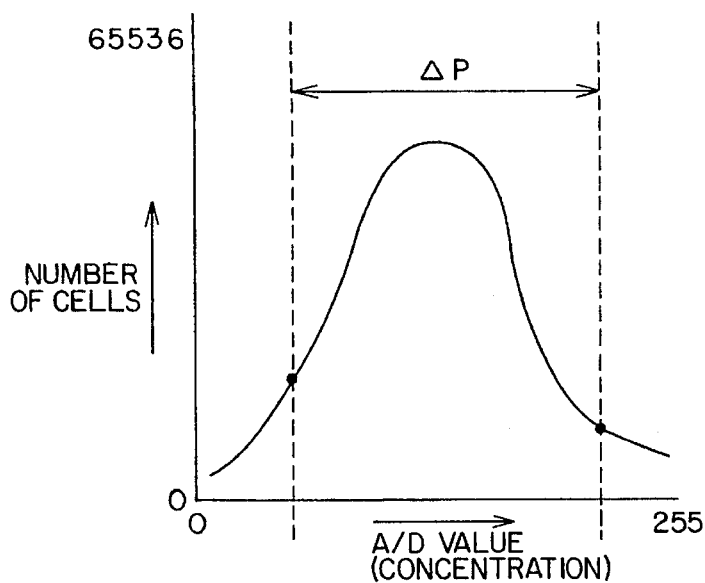
FIGS. 18A to 18C show histograms representing the number of pixels.
Figure 18B:
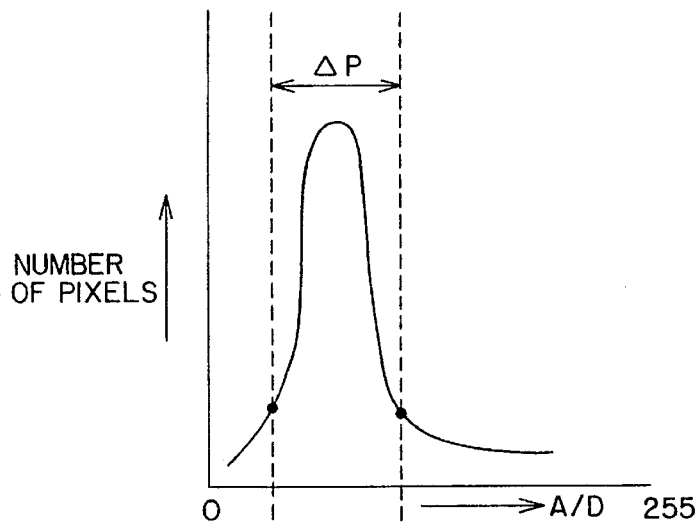
Figure 18C:
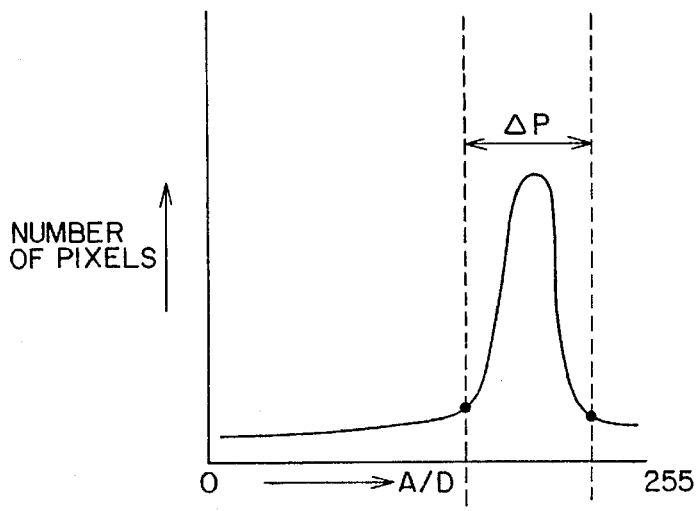
Figure 19:
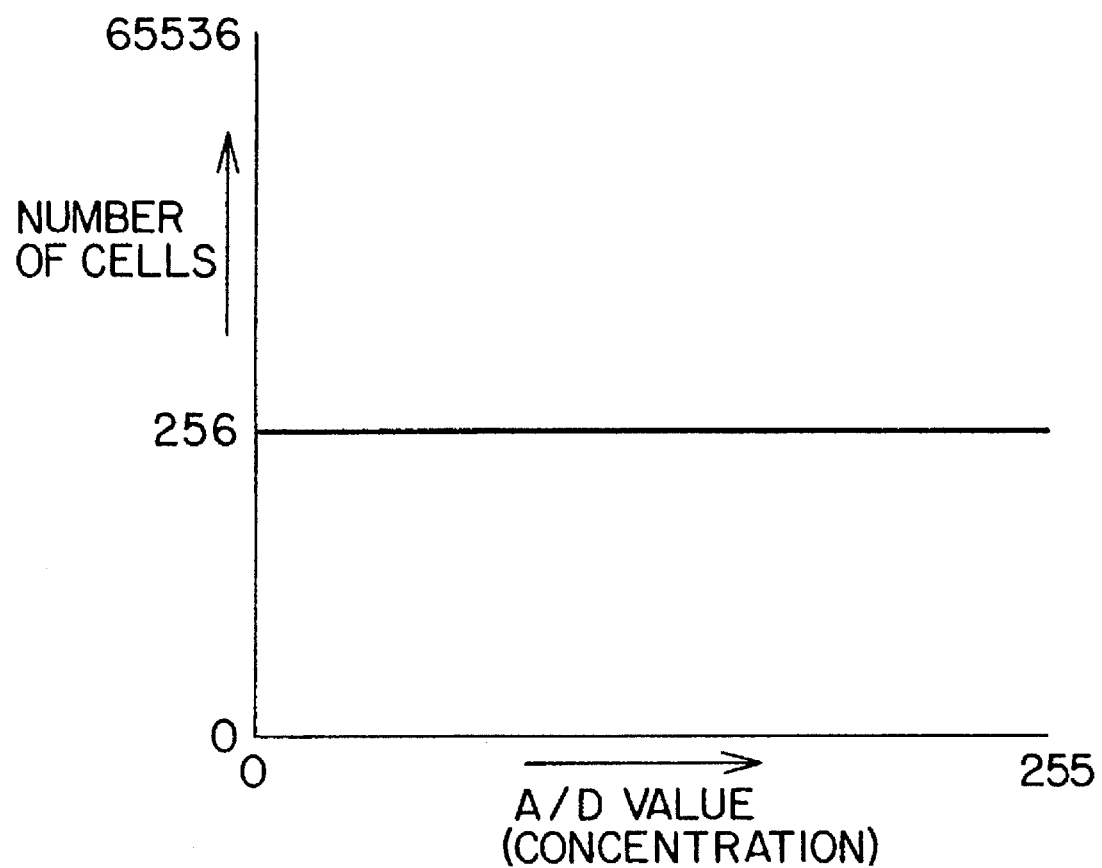
FIG. 19 is a histogram showing the number of cells.

In general, fingerprint data that is obtained through utilization of the total reflection under automatic contrast control by software processing of the prism surface presents such a concentration histogram as shown in FIG. 18-a. The abscissa represents A/D converted data value (the output signal from the CCD being converted to digital form and stored in a memory); the afore-mentioned A/D converter 109 is an 8-bit high-speed A/D converter and the data varying range covers 256 gradations (0 to $FF=0 to 255). The ordinate represents the number of cells, which is 256×256= 65536 pixels. Thus, FIG. 18-a is a concentration histogram indicating the number of pixels for each gradation.

In the cases of a dry fingerprint, a wet fingerprint and a fingerprint lacking linearity, the concentration is unbalanced as shown in FIGS. 18-b and 18-c and a range indicated by ΔP tends to narrow. By removing such an imbalance of concentration and making it uniform, it is possible to obtain a high-contrast, clear image.

Figure 20:
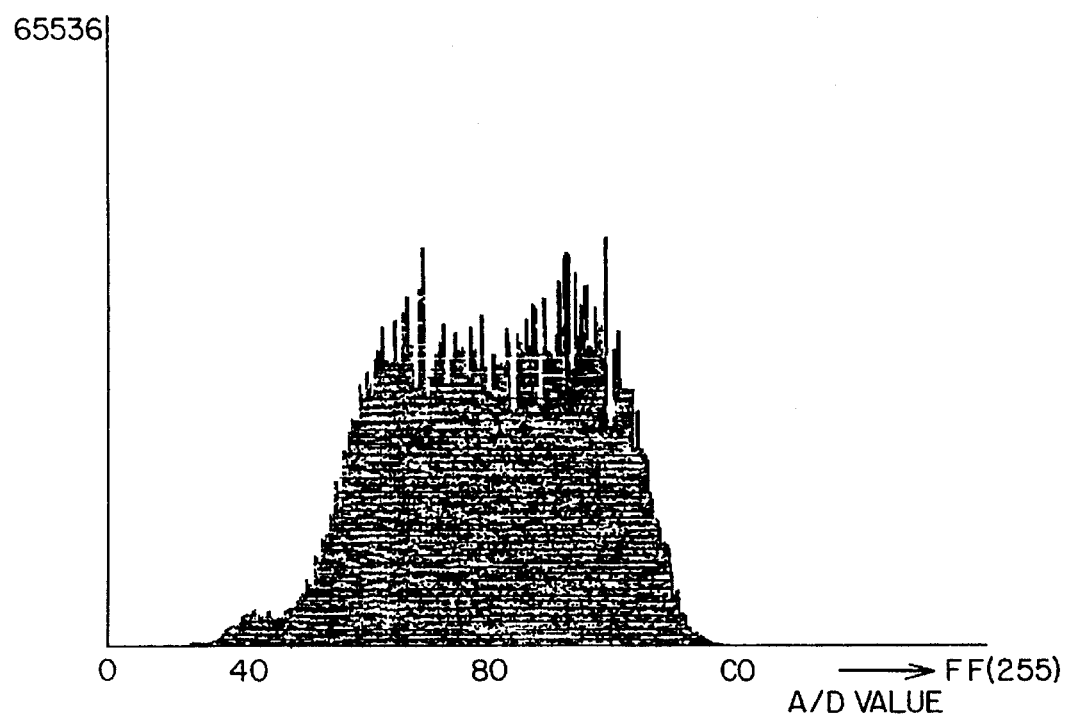
FIG. 20 is a histogram showing input data intact.
Figure 21:
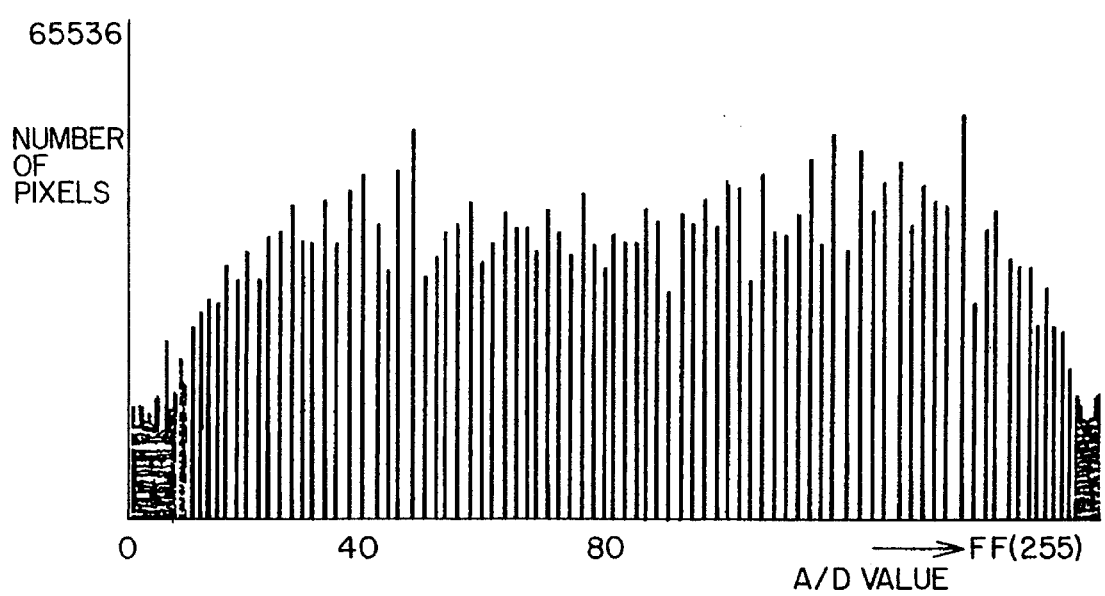
FIG. 21 is a histogram of the input data subjected to distribution processing.
Figure 22:
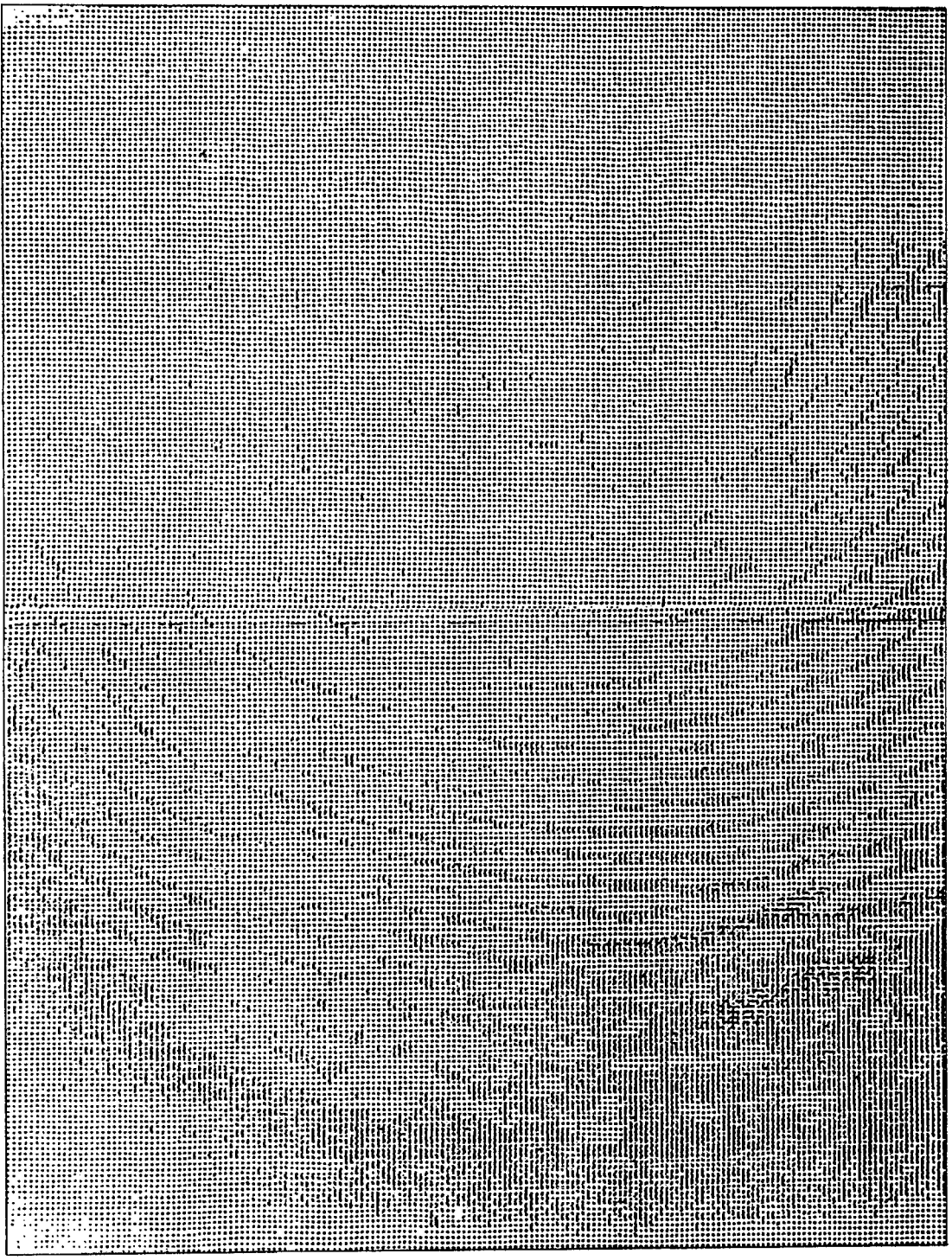
FIG. 22 is a display image of a fingerprint of the input data before being subjected to distribution processing.
Figure 23:
FIG. 23 is a display image of the fingerprint of the input data after being subjected to distribution processing.

Such input data as shown in FIG. 20 is distributed into such a form as depicted in FIG. 21. As the result of this, a fingerprint depicted in FIG. 22 changes to such as shown in FIG. 23. FIG. 20 is a concentration histogram of the fingerprint shown in FIG. 22 and the image corresponding to the data subjected to the distribution processing, shown in FIG. 21, is shown in FIG. 23. As is evident from comparison of FIGS. 22 and 23, the constrast of the image is considerably improved. It has been ascertained experimentally that the fingerprint of FIG. 22, hard to recognize by the prior art, was made recognizable. It has also been proved that satisfactory contrast and uniform data could be obtained by the distribution processing alone, without performing the averaging process.

Since the time for the distribution processing is 1/35 that for the averaging process, this embodiment performs the distribution processing to provide a uniform distribution of concentration to effect automatic contrast control. In this distribution processing, each pixel is represented by m(xi, yj), where (xi, yj) is the pixel position (x coordinate, y coordinate), i=0 to 255. m is the number of each pixel in ascending order of concentration, that is, in ascending order of powers of (xi, yj). Thus, m takes values from 1 to 65536. Next, m(xi, yj) is converted to [n=int256/m], where int256/m is a quotient of dividing m by 256; hence, n=o to 255. This n is the concentration at the position (xi, yj) after the distribution processing.

Figure 24:
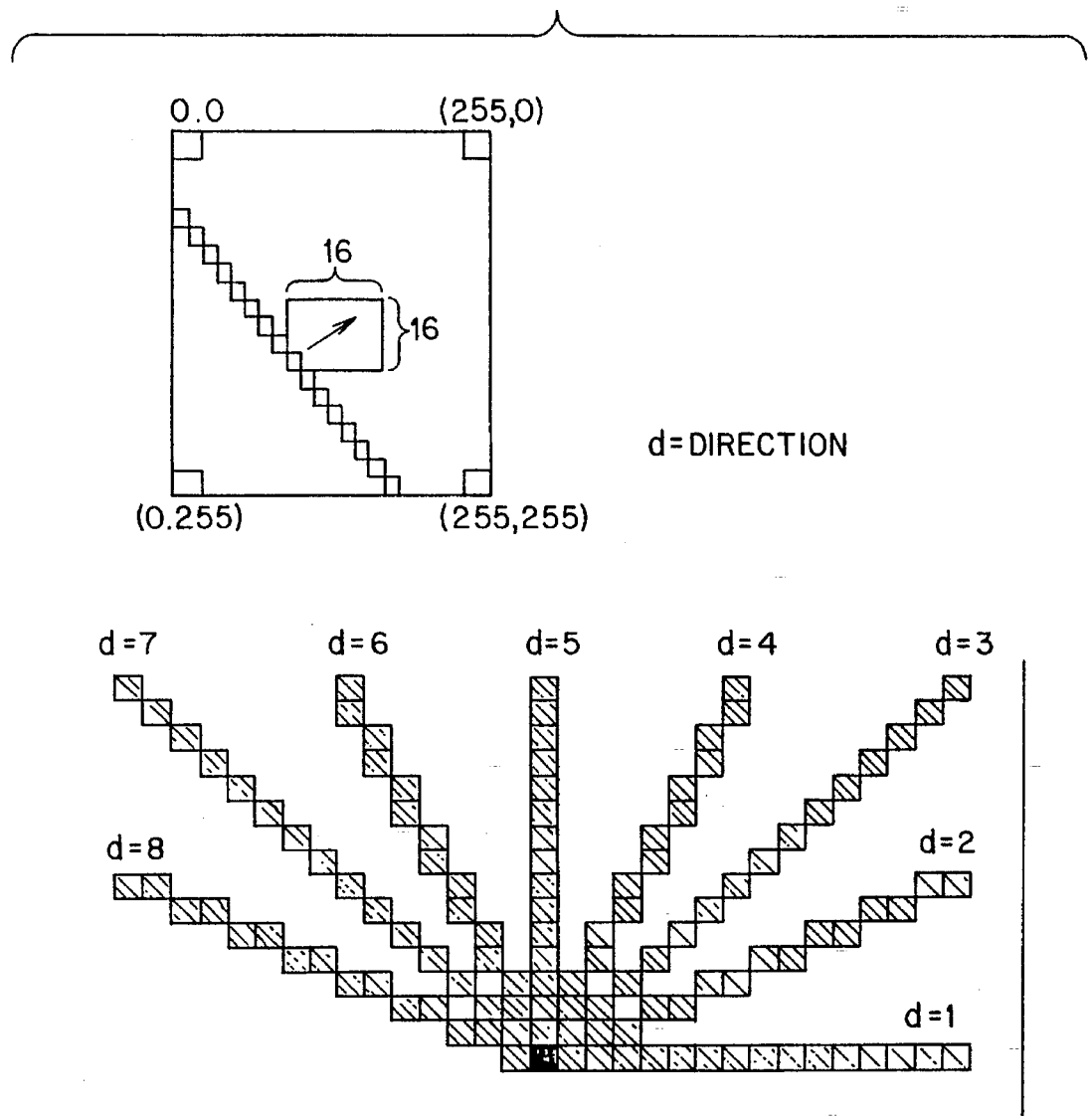
FIG. 24 schematically shows slit-like windows.

In the computation for the identification of a fingerprint by a curvature pattern, the bulge-line direction is obtained in the binary 256 by 256 area every 16 by 16 sub-area through use of slit-like windows such as shown in FIG. 24. In this case, the mean concentration $Ad^{(m)}$ in each window is detected while shifting the window vertically by one pixel at one time.

$$Ad^{(m)} = \frac{1}{16} \sum_{m=1}^{16} gm$$

where d=1 to 8 and m=1 to L, L being the number of positions which is determined by the direction d. Next, the mean concentration distribution Vd in the same direction is computed by the following equation.

$$Vd(i) = \frac{1}{L} \sum_{m=1}^{L} \{Ad^{(m)} - \overline{Ad}\}^2, \text{ where } \overline{Ad} = \frac{1}{L} \sum_{m=1}^{L} Ad^{(m)}$$

The direction in which the value Vd is the largest in the bulge-line direction in this area. The number of positions which is determined by the direction d (1 to 8) changes as shown in FIGS. 25-a through 25-c.

Figure 25C:
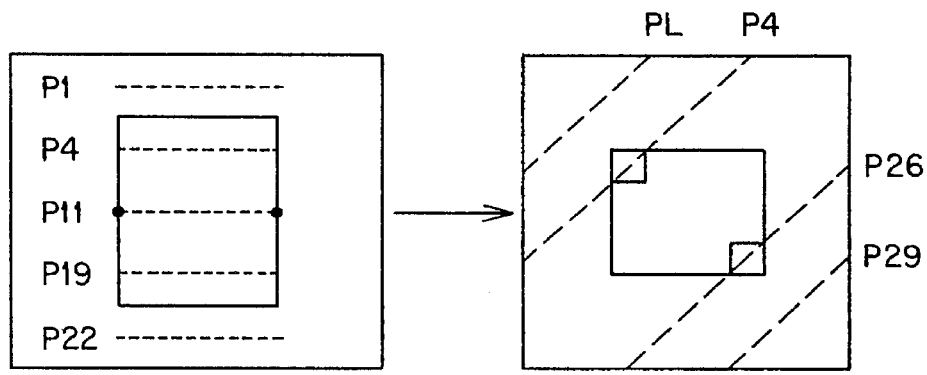
Figure 25C:
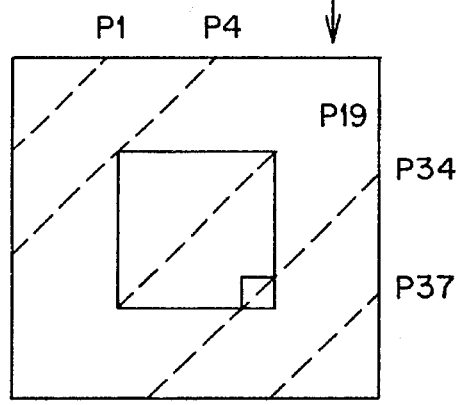

In FIG. 25-a, when the direction d=1, data on 22 positions is computed. In FIG. 25-b, when d=2, data on 29 positions is computed. In FIG. 25-c, when d=3, data on 37 positions are computed. When d=4, 6 and 8, the number of positions on which data is computed is the same as in the case of d=2; when d=5, data is computed on the same number of positions as in the case of d=1; and when d=7, data is computed on the positions of the same number as in the case of d=3.

As shown in FIGS. 27, 32×32 pieces of bulge-line direction data in the 16×16 areas are used to compute the curvature of the bulge line in the eight adjoining cells all over the area.

Figure 28:
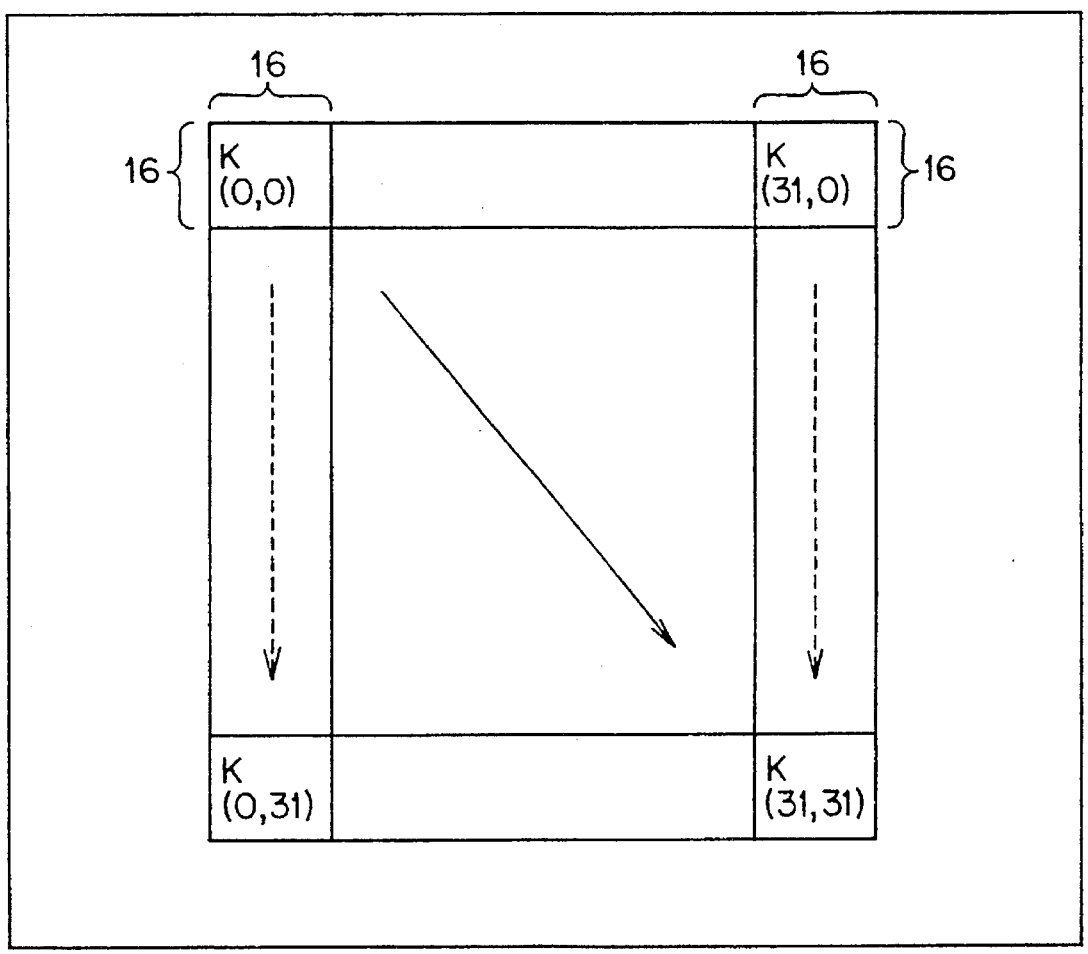
FIG. 28 shows a circumstance where no computation is conducted.

As shown in FIG. 28, when a background area exists, if one or both of G(m1) and G(m2) are not present, no computation is conducted.

Figure 26:
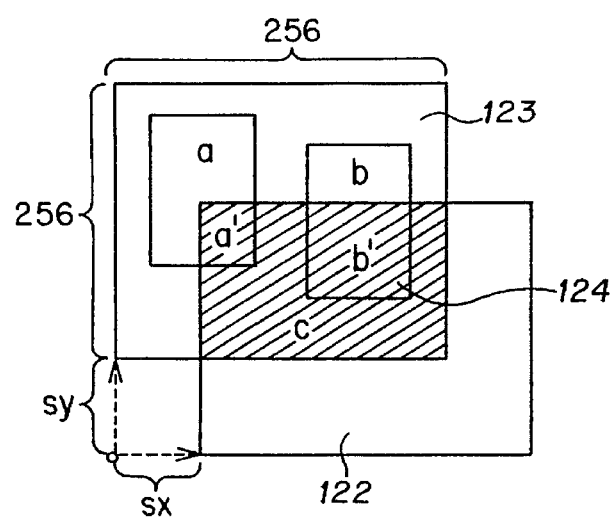
FIG. 26 is a diagram for explaining the comparison of a bulge-line direction pattern and its curvature pattern.

FIG. 26 is a diagram for explaining the comparison of bulge-line direction patterns and bulge-line direction curvature patterns of the data to be examined 122 and the registered data. For this comparison, the data to be registered 123 is converted to binary form 124 and subjected to thinning and the bulge-line direction and curvature in the bulge-line data are computed. Furthermore, the positions and directions of minutiae are computed and stored, and the bulge-line direction and its curvature in the binary data 124 are computed. The bulge-line direction data and curvature data of the data to be examined are matched against those of the registered data to detect the position (sx, sy) where a deviation S(x, y) is minimum. When the matching degree is above an upper threshold value, the examinee is judged to be the person of the registered data, and when the matching degree is Under a lower threshold value, the examinee is judged to be an outsider. The matching degree is obtained on the basis of 32×32=1024 pieces of bulge-line direction and curvature data. At the above-said position (sx, sy) the differences in direction and curvature are minimum.

Letting the areas of the registered data where many minutiae exist be represented by a and b, areas a' and b' in an area c displaced from that by (sx, sy) are thinned. The position, kind and direction of each minutia of the data to be examined are checked against those of the registered data;

when the matching degree is above the upper threshold value, the examinee is identified as the person of the registered data, and when the matching degree is under the lower threshold value, the examinee is judged to be an outsider. When the matching degree is above the lower threshold value but under the upper one, the area c (except those a' and b') is thinned and minutiae are extracted; then, similar matching is conducted and the examinee is judged in the same fashion as mentioned above. This method does not ever affect the matching accuracy and rate.

Unlike the conventional simple smoothing scheme, the automatic contrast control according to the present invention permits the generation of high-contrast data and effective removal of noise, and hence is very effective pre-processing means for reducing the overall processing time and enhancing the recognition rate. By thinning only those areas containing many minutiae, the matching time is substantially reduced.

What is claimed is:

1. A fingerprint ID system which compares input fingerprint image data with registered image data, comprising:

thinning processing means for thinning binary image data, said thinning processing means having thinning determination means which determines a deletable point in said binary image data by a table search in units of eight neighboring cells, and scan control means which reduces the number of times of scanning of said thinning determination means;

minutia extracting means for extracting minutiae from said image data, said minutia extracting means having means for extracting minutia candidates from said thinned image data by a table search in units of eight neighboring cells, and pseudo minutia removing means for excluding pseudo minutiae from said minutia candidates;

means for registering true minutiae of said image data;

minutia matching means for matching minutiae of said input fingerprint image data with registered minutiae;

means for registering template data for template matching;

template matching means for template matching said input fingerprint image data with registered data; and means for:
     comparing results of said minutia matching means and results of said template matching means in terms of recognition rate,
     selecting the results of said minutia matching means for identifying said input fingerprint image data when the results of said minutia matching means have a higher recognition rate than the results of said template matching means, and
     selecting the results of said template matching means for identifying said input fingerprint image data when the results of said template matching means have a higher recognition rate than the results of said minutia matching means.

2. The system of claim 1, wherein said thinning determination means comprises:

means for computing an adjoining cell pattern index value which is the sum total of products of predetermined weighting factors respectively assigned to eight adjoining cells surrounding a center one and pixel values of said eight adjoining cells;

means for making a table search in a memory for all combinations of cell patterns which allow changing the pixel value of said center cell from "1" to "0," said memory having stored therein said adjoining cell pattern index values of said eight adjoining cells; and means for changing the pixel value of said center cell from "1" to "0."

3. The system of claim 1, wherein said scan control means comprises:

first image data scanning means for scanning said image data over an area of a predetermined size, said first image data scanning means including: means for actuating said thinning determination means for each pixel on every scanning line; and means for storing, in a memory, scan control data containing at least a flag representing whether the thinning has converged on each scanning line, positional information of that one of said adjoining cells for which the thinning has not converged on each said scannning line, and the number of contiguous cells for which the thinning has not converged on each said scanning line;

second and subsequent image data scanning means for scanning said image data only when the thinning has not converged in the preceding image data scanning, said second and subsequent image data scanning means including means for updating contents of said scan control data; and means for determining whether the thinning of said image data has converged or not and for repeating said second and subsequent image data scanning until the thinning of said image data converges.

4. The system of claim 1, wherein said minutia extracting means comprises:

means for computing an adjoining cell pattern index value for each of eight adjoining cells surrounding a center one;

means for making a table search for said adjoining cell pattern index value from those stored in a memory; and means whereby, when the same adjoining cell pattern index value as that of said input fingerprint data is found in said memory, the cell concerned is registered as a minutia candidate.

5. The system of claim 1, wherein said pseudo minutia removing means excludes said minutia candidate when the direction of said minutia candidate is the same as that of a counterpart of said registered fingerprint image data and a distance between them is smaller than a predetermined value.

6. The system of claim 1, wherein said minutia registering means comprises:

means for selecting, as a master branch point, a branch point closest to a center point of said image data;

means for selecting, as sub-branch points, branch points closest to said master branch point in first, second, third and fourth quadrants of an X-Y coordinate system with said master branch point at the origin thereof;

means for selecting a predetermined number of branch points in increasing order of distance to said sub-branch point in each of said first through fourth quadrants as sub-sub-branch points therein; and means for registering at least the total number of branch points, their positional information, the positional relationships between said master branch point and said sub-branch points, and the positional relationships between said sub-branch point and said sub-sub-branch points in each quadrant.

7. A fingerprint ID system which compares input fingerprint image data with registered image data, comprising:

thinning processing means for thinning binary image data, said thinning processing means having thinning determination means which determines a deletable point in said binary image data by a table search in units of eight neighboring cells, and scan control means which reduces the number of times of scanning of said thinning determination means;

minutia extracting means for extracting minutiae from said image data, said minutia extracting means having means for extracting minutia candidates from said thinned image data by a table search in units of eight neighboring cells, and pseudo minutia removing means for excluding pseudo minutiae from said minutia candidates;

means for registering true minutiae of said image data, said image data including a plurality of quadrants;

minutia matching means for matching minutiae of said input fingerprint image data with registered minutiae, said minutia matching means including:

means for comparing the total number of branch points in said input fingerprint image data and the total number of branch points in said registered fingerprint image data;

means for selecting a predetermined number of sub-branch points in increasing order of distance to a center point of said input fingerprint image data as master branch point candidates;

means for determining if one said sub-branch point in each said quadrant in said input fingerprint image data lies in the vicinity of a corresponding sub-branch point in said registered fingerprint image data;

means for determining if sub-sub-branch points in each said quadrant in said input fingerprint image data each lie in the vicinity of a corresponding one of sub-sub-branch points in said registered fingerprint image data;

means for scoring a degree of mismatching between said sub-branch points in said input and registered fingerprint image data on the basis of a norm when said sub-branch point in said input fingerprint image data lies in the vicinity of said corresponding sub-branch point in said registered fingerprint image data;

means for scoring the degree of mismatching between said sub-sub-branch points in said input and registered fingerprint image data on the basis of a norm when said sub-sub-branch points lie in the vicinities of said corresponding sub-sub-branch points in said registered fingerprint image data;

means for computing a mean mismatching degree of said master branch point candidates;

means for selecting, as a master branch point in said input fingerprint image data, that one of said master branch point candidates which has a minimum means mismatching degree; and means for judging an examinee to be a person of said registered fingerprint image data when the mean mismatching degree of said master branch point in said input fingerprint image data is smaller than a predetermined value;

means for registering template data for template matching; and template matching means for template matching said input fingerprint image data with registered data.

8. A fingerprint ID method which compares input fingerprint image data with registered image data, comprising the steps of:

processing binary image data for thinning, said thinning step including a thinning determination step which determines a deletable point in said binary image data by a table search in units of eight neighboring cells and a scan control step which reduces the number of times of scanning of said thinning determination step;

extracting minutiae from said image data, said minutia extracting step including a step which extracts minutia candidates from said thinned image data by a table search in units of eight neighboring cells and a step which excludes pseudo minutiae from said minutia candidates;

registering true minutiae of said image data;

matching minutiae of said input fingerprint image data with registered minutiae;

registering template data for template matching;

template matching said input fingerprint image data with said registered data;

comparing results of said minutia matching step and results of said template matching steps in terms of recognition rate;

selecting the results of said minutia matching step for identifying said input fingerprint image data when the results of said minutia matching step have a higher recognition rate than the results of said template matching step; and selecting the results of said template matching step for identifying said input fingerprint image data when the results of said template matching step have a higher recognition rate than the results of said minutia matching step.

9. A fingerprint ID method which compares registered fingerprint data and input fingerprint data obtained by automatic contrast control by software, characterized by:

first matching wherein a bulge-line direction pattern and a bulge-line curvature pattern of said registered fingerprint data are compared with those of said input fingerprint data and aligned with each other; the matching degree of said bulge-line direction and curvature patterns in overlapping areas thereof is computed; when said matching degree is above an upper threshold value, an examinee is judged to be the person of said registered fingerprint data; and when said matching degree is under a lower threshold value, said examinee is judged to be an outsider; and at least one second matching step wherein when said matching degree is above said lower threshold value and under said upper threshold value, only those areas of said input fingerprint data which match minutia high-density and medium-density areas of said registered fingerprint data are subjected to thinning to extract minutiae; the matching degree of said extracted minutiae is computed in terms of their position, kind and direction; when said matching degree in said high-density area is above said upper threshold value, said examinee is judged to be the person of said registered fingerprint data, and when said matching degree is under said lower threshold value, said examinee is judged to be an outsider, and when said matching degree is above said lower threshold value and under said upper threshold value, said examinee is judged to be an outsider; and when said matching degree in said medium-density area is above said upper threshold value, said examinee is judged to be the person of said registered fingerprint data, and when said matching degree is under said lower threshold value, said examinee is judged to be an outsider, and when said matching degree is above said lower threshold value and under said upper threshold value, said examinee is judged to be an outsider.

* * * * *